(12) United States Patent
Yabe et al.

(10) Patent No.: US 6,400,110 B1
(45) Date of Patent: Jun. 4, 2002

(54) WIPER CONTROL APPARATUS

(75) Inventors: Hiroo Yabe; Kazuhiro Kubota, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 51 days.

(21) Appl. No.: 09/580,589

(22) Filed: May 30, 2000

(30) Foreign Application Priority Data

May 31, 1999 (JP) ............................................ 11-151903

(51) Int. Cl.[7] .............................. H02P 1/04; H02P 5/00; H02P 7/00
(52) U.S. Cl. ........................ 318/443; 318/444; 318/445
(58) Field of Search .................... 15/250.12, 250.16, 15/250.17; 318/280–283, 443–445, 484, DIG. 2

(56) References Cited

U.S. PATENT DOCUMENTS

| | | | |
|---|---|---|---|
| 4,851,745 A | * 7/1989 | Ponziani | 318/443 |
| 5,235,260 A | * 8/1993 | Furukoshi | 318/443 |
| 5,245,259 A | * 9/1993 | Nakamura et al. | 318/443 |
| 5,786,676 A | * 7/1998 | Ogawa et al. | 318/443 |
| 6,023,107 A | * 2/2000 | Grass | 318/443 |

FOREIGN PATENT DOCUMENTS

JP          9-193748          7/1997

* cited by examiner

*Primary Examiner*—Marlon T. Fletcher
(74) *Attorney, Agent, or Firm*—Armstrong, Westerman & Hattori, LLP

(57) ABSTRACT

A wiper control apparatus includes a combination switch 2, a wiper motor 2, an autostop (AS) switch 8, a first semiconductor switch element 4 for on/off controlling energization of the wiper motor, and a controller for supplying an ON/OFF control signal to the first semiconductor switch element. While the wiper operates in the operation mode set by the combination switch, if the level of the signal produced from said AS switch does not vary for a longer period than a prescribed abnormality detecting period owing to occurrence of abnormality of said wiper motor, said controller forcibly turns off said first semiconductor switch element. In this configuration, a wiper control apparatus can be provided which is compact, reliable and surely operable using a semiconductor switch and a controller digital controlled.

18 Claims, 19 Drawing Sheets

WIPER CONTROL APPARATUS

BACKGOUND OF THE INVENTION

1. Field of the Invention

The present invention relates to a wiper control apparatus using a semiconductor switching element such as a MOSFET.

2. Description of the Prior Art

One of previously known wiper control apparatus is disclosed in JP-A-9-193748. In this wiper control apparatus, as seen from FIG. 21, when a combination switch 17 is set at an intermittent mode (INT), a driving circuit 20 turns on an interruption switch MOSFET 19 to start a motor 15 so that a wiper reciprocates once. Then, the terminals P and Q of a wiper switch 16 are connected to each other. Then, the driving circuit 20 turns off the interruption switch 19 to interrupt the power supply to the motor 15. When the terminals P and Q of the wiper switch 16 are connected, a battery-voltage side terminal K and a ground side terminal J are connected to each other through a contact terminal T1 and braking resistor 18 so that the motor 15 is braked. Thus, the wiper stops quickly.

However, the wiper control apparatus presents the following problems.

(1) When the wiper motor 15 generates an abnormal current as if it is locked, a large current continues to flow through a MOSFET 19 or resistor 18. Therefore, the resistor 18 or MOSFET 19 may be excessively heated and burned. In order to avoid the burning, a countermeasure for setting a large current rating for the resistor 18 and MOSFET 19 and providing a radiator is required. This upsizes the apparatus and makes it expensive.

(2) When the plus terminal and minus terminal of a battery 11 are erroneously connected in a reverse direction, a large current continues to flow through the parasitic diode of the MOSFET 19 and the resistor 18. Therefore, the resistor 18 and the MOSFET may be burned.

(3) For some time after the MOSFET 19 turns on, since the terminals P and Q of the wiper switch 16 remain connected, a tunneling current will flow through a passage of wiper switch 16→resistor 18→MOSFET 19 from the battery 11. This leads to unnecessary dissipation of heat and noise.

(4) Setting the intermittent time and the after-wash wiping operation time after the washer has been operated is carried out in an analog manner using the charging/discharging theory of a capacitor. This leads to a large change in these times.

SUMMARY OF THE INVENTION

An object of the present invention is to solve the problem of the conventional wiper control apparatus to provide a wiper control apparatus which is compact, reliable and surely operable using a semiconductor switch and a digital controller.

In order to attain the above object, in accordance with the first aspect of the present invention, there is provided a wiper control apparatus comprising:

a combination switch for setting an operation mode of a wiper at an intermittent wiper operation mode or a continuous wiper operation mode by means of position setting;

a wiper motor which is driven according to the operation mode set by the combination switch;

an autostop (AS) switch for producing a signal having a level varying according to a park position and other positions as the wiper motor rotates;

a first semiconductor switch element for on/off controlling energization of the wiper motor;

a controller for supplying a ON/OFF control signal to the first semiconductor switch element, wherein while the wiper operates in the operation mode set by the combination switch, if the level of the signal produced from the AS switch does not vary for a longer period than a prescribed abnormality detecting period owing to occurrence of abnormality of the wiper motor, the controller forcibly turns off the first semiconductor switch element.

In this configuration, when the abnormality of the wiper motor occurs, the controller monitors the duration of the abnormality to interrupt the energization. Therefore, the semiconductor switch element is not required to be excessively upsized, and hence can be down-sized and made inexpensive. In addition, the reliability of the entire wiper control apparatus inclusive of a driving circuit and a wiper motor is improved.

Preferably, after the abnormality is released, the controller decides that a set position of the combination switch has been changed and turns on the first semiconductor switch element to operate the wiper in the operation mode corresponding to the changed position. In this configuration, by position setting after the abnormality of the wiper motor has been released, the wiper operation can be resumed in the operation mode corresponding to the selected position.

Further, preferably, the controller is supplied with a driving voltage through an ignition switch from a battery, and after the abnormality is released, the controller detects re-energization successive to "off" of the ignition switch to turn on the semiconductor switch element and restores the operation of the wiper which had been set when the abnormality has occurred. In this configuration, by the turn off and re-energization of the ignition switch, the wiper operation stopped owing to occurrence of the abnormality can be restored.

In accordance with the second aspect of the present invention, there is provided a wiper control apparatus comprising:

a combination switch for setting an operation mode of a wiper at an intermittent wiper operation mode or a continuous wiper operation mode by means of position selection;

a wiper motor which is driven according to the operation mode set by the combination switch;

an autostop (AS) switch for producing a signal whose level varies according to a park position and other positions as the wiper motor rotates;

a first semiconductor switch element for on/off controlling energization of the wiper motor;

a controller for supplying an ON/OFF control signal to the first semiconductor switch element, wherein when an OFF position of the combination switch is set while the wiper operates, the controller maintains the "ON" of the first semiconductor switch element until the AS switch produces a signal having the level corresponding to the park position of the wiper. In this configuration, even when the combination switch is changed into the OFF position, the controller keeps the ON of the semiconductor switch element until the wiper returns to the park position, the wiper does not stop on the way.

In accordance with the third aspect of the present invention, there is provided a wiper control apparatus comprising:

a combination switch for setting an operation mode of a wiper at an intermittent wiper operation mode or a continuous wiper operation mode by means of position selection;

a wiper motor which is driven according to the operation mode set by the combination switch;

an autostop (AS) switch for producing a signal whose level varies according to a park position and other positions as the wiper motor rotates;

a first semiconductor switch element for on/off controlling energization of the wiper motor;

a second semiconductor switch element for turning on a closed circuit for braking the wiper motor by passing a reverse current through the wiper motor while energization of the wiper motor is off;

a controller for supplying a first ON/OFF control signal to the first semiconductor switch element and a second ON/OFF control signal to the second semiconductor switch element, wherein the controller provides a time delay td between rising edges or between trailing edges of the first control signal and the second control signal.

In this configuration, since the controller provides a time delay td between rising edges or between trailing edges of the first control signal and the second control signal, it is possible to prevent the first and second semiconductor switch elements from turning on simultaneously and a tunneling current from flowing, thus eliminating unnecessary dissipation of heat and noise.

Preferably, the first semiconductor switch element is an N-channel type MOSFET and the second semiconductor switch element is a P-type MOSFET. Therefore, these semiconductor switch elements can be down-sized and made inexpensive.

Preferably, a Zener diode is connected in series with the second semiconductor switch element. Therefore, the reverse electromotive force of the wiper motor when the first semiconductor switch element is overheated and interrupted can be dissipated. The second semiconductor switch element when it is reversed-connected owing to erroneous connection of the battery can be protected. Further, the second semiconductor switch element can be surely turned off by shifting the potential at the control electrode.

In accordance with the fourth aspect of the present invention, there is provided a wiper control apparatus comprising:

a combination switch for setting an operation mode of a wiper at an intermittent wiper operation mode, a continuous wiper operation mode or a washer operation mode by means of position selection;

a wiper motor which is driven according to the operation mode set by the combination switch;

an autostop (AS) switch for producing a signal whose level varies according to a park position and other positions as the wiper motor rotates;

a first semiconductor switch element for on/off controlling energization of the wiper motor;

a washer motor which is energized and driven by the combination switch while the wiper operates in the washer mode;

a controller for supplying an ON/OFF control signal to the first semiconductor switch element, wherein the controller controls the first semiconductor switch element to be "ON" while the combination switch is at the washer operation mode, and keeps the "ON" of the first semiconductor switch element until the wiper reciprocates by a prescribed number of times to perform an after-wash wiping operation after the combination switch has been changed into the OFF position.

In this configuration, the number of times of after-wash wiping can be defined precisely so that its error can be removed.

Preferably, the prescribed number of times can be variable set by the controller. Therefore, it can be set at any optional number of times.

Preferably, when the combination switch is changed from the washer operation mode into the OFF position through another mode, if the number of times of the after-wash wiping does not still reach a prescribed value, the controller keeps the "ON" of the first semiconductor element until the wiper performs the after-wash wiping by the remaining number of times. In this configuration, even when the combination switch is changed from the ON position to the OFF position during the after-wash wiping after the wash operation has been made, the number of times of the after-wash wiping can be defined precisely so that its error can be eliminated.

In the first aspect, preferably, the combination switch includes a variable resistor for adjusting an intermittent time while it is in the intermittent wipe operation mode, and the controller includes an VR input terminal for inputting a resistance value of the variable resistor from the combination switch so that the resistance value of the variable resistor is A/D converted to set the intermittent time in a digital manner.

In this configuration, since the intermittent time can be precisely set at a prescribed time by the controller, the timing accuracy of the intermittent operation can be improved.

Preferably, the controller sets the intermittent time at a prescribed value when the VR input terminal is released. In this configuration, when the VR input terminal is released, the timing accuracy of the intermittent operation can be improved.

In accordance with the fifth aspect of the present invention, there is provided a wiper control apparatus comprising:

a combination switch for setting an operation mode of a wiper at an intermittent wiper operation mode or a continuous wiper operation mode by means of position setting;

a wiper motor which is driven according to the operation mode set by the combination switch;

an autostop (AS) switch for producing a signal whose level varies according to a park position and other positions as the wiper motor rotates;

a first semiconductor switch element for on/off controlling energization of the wiper motor; and a controller for supplying an ON/OFF control signal to the first semiconductor switch element, wherein the first semiconductor switch element is provided with an overheating interruption/protection circuit so that it is self-interrupted by the over-heating interruption/protection circuit when it is overheated owing to occurrence of abnormality of the wiper motor.

In this configuration, before the first semiconductor switch is broken owing to its overheating, the over-heating interruption/protection circuit turns off the gate of the MOSFET 4 and stops the energization thereof. Namely, when the abnormal current continue to flow, the current is interrupted quickly so that the current rating of the first semiconductor switch is not required to be excessively large. Thus, the first semiconductor switch can be downsized and made inexpensive. The reliability of the apparatus inclusive of the driving circuit and motor can be improved.

Preferably, after the abnormality is released, the controller decides that a set position of the combination switch has been changed and turns on the first semiconductor switch element to operate the wiper in the operation mode corresponding to the selected position.

In this configuration, by changing the set position after the abnormality of the wiper motor has been released, the wiper operation can be resumed in the operation mode corresponding to the changed set position.

Preferably, the controller is supplied with a driving voltage through an ignition switch from a battery, and after the abnormality is released, the controller detects re-energization successive to "off" of the ignition switch to turn on the semiconductor switch element and restore the operation of the wiper which had been set when the abnormality has occurred. In this configuration, by the turn off and re-energization of the ignition switch, the wiper operation stopped owing to occurrence of the abnormality can be restored.

In the first to the fifth aspects of the invention, preferably, the first semiconductor switch element is connected to an upstream side or downstream side of the wiper motor. In this configuration, since the first semiconductor switch element may be arranged at either the downstream side or upstream side, particularly, where it is arranged on the upstream side, its protection against the failure such as shorting of a wire can be made, thereby improving the safety for the apparatus.

In the first to fifth aspects of the invention, preferably, the controller chopper-controls the ON/OFF control signal to the first semiconductor switch element so that the wiper motor is driven at variable speeds.

In this configuration, the structure of the wiper control apparatus can be simplified. By varying the duty ratio of the control signal, the speed of the wiper motor can be made variable in plural steps of three or more or continuously. Further, the chopper frequency is adjusted to avoid the resonance frequency different for a vehicle type, thereby suppressing the noise by the chopper control.

Preferably, in the fifth aspect of the invention, if the wiper has not yet been returned when the ignition switch is energized, the controller drives the wiper motor at a high speed so that the wiper is returned to the park position.

In this configuration, where the wiper remains on the windshield glass when the IG switch is energized, by returning the wiper to the park position in the high speed mode, the field of viewer can be assured swiftly.

Preferably, the wiper control apparatus according to any one of the first to fifth aspects can be employed together with a relay-type wiper control apparatus, and the controller controls the operation of both wiper control apparatus and relay-type control apparatus.

In this configuration, the controller includes the collected function of controlling both the semiconductor switch(es) and relay, and hence down-sized and made inexpensive. The control is correlated between the front wiper and rear wiper.

The above and other objects and features of the present invention will be more apparent from the following description taken in conjunction with the accompanying drawings.

DESCRIPTION OF THE PREFERRED EMBODIMENTS

Figure 1:
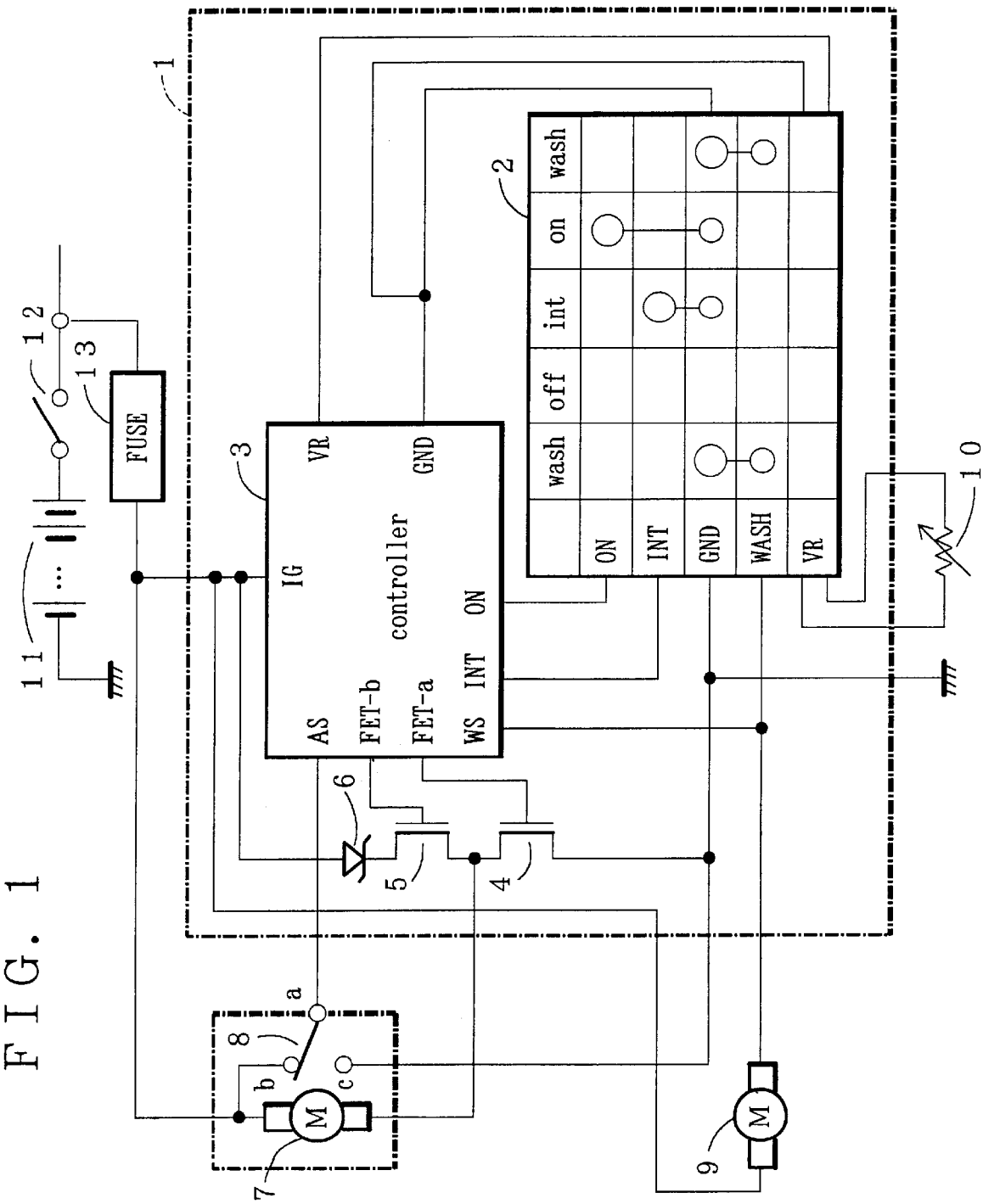
FIG. 1 is a block diagram showing an embodiment of the wiper control apparatus according to the present invention.

Now referring to the drawings, an explanation will be given of several embodiments of a wiper control apparatus according to the present invention.

FIG. 1 is a block diagram of an embodiment of the wiper control apparatus according to the present invention. The wiper control apparatus includes a control unit, generally 1, a wiper motor 7, an AS (autostop) switch 8 and a washer motor 9. The control unit 1 includes a combination switch 2, a controller 3, MOSFETs 4, 5 and a Zener diode 6.

The combination switch 2 serves to set various operation modes of a wiper by an operation by a vehicle driver. The combination switch 2 permits the operation modes of the wiper, i.e. an OFF (stopping) mode., INT (intermittent operation) mode, ON (continuous operation) and WASH (washing) mode to be made through a combination of connection of an ON terminal, an INT terminal, GND terminal and a WASH terminal. The combination switch 2 also includes a VR terminal for connecting a variable resistor 10 for setting an intermittent time.

Figure 2:
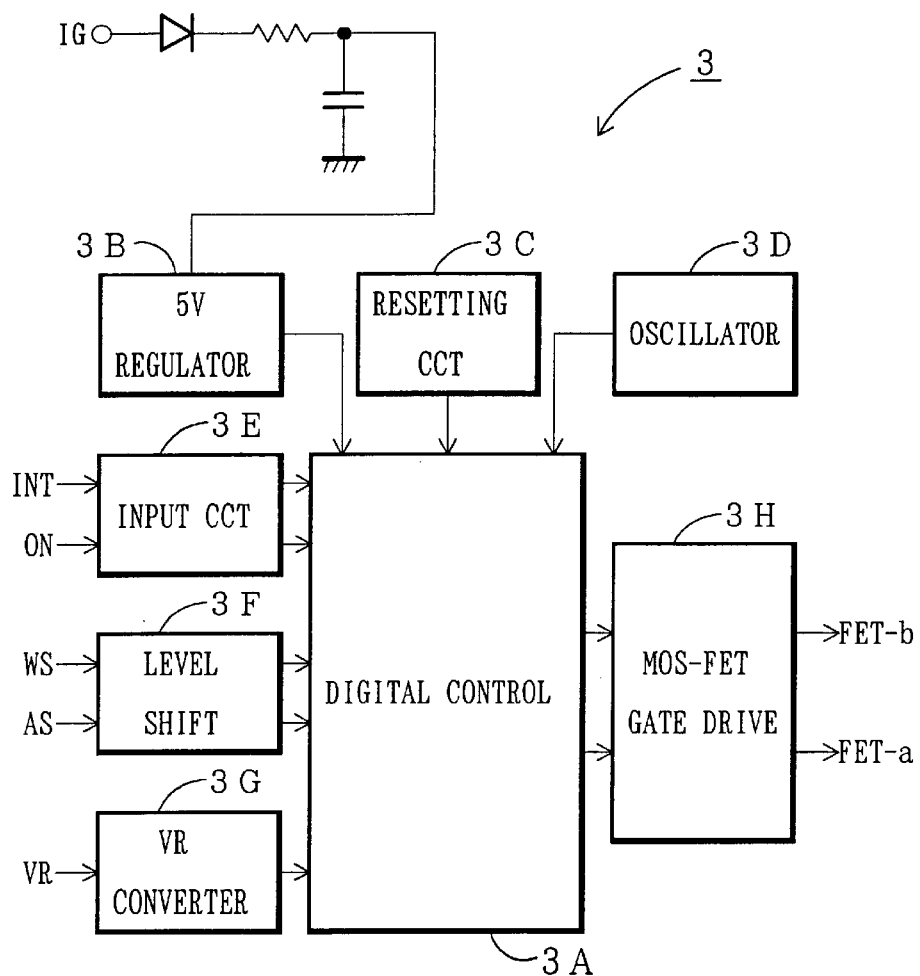
FIG. 2 is a block diagram of a typical configuration of the controller in a wiper control apparatus of FIG. 1.

The controller 3, whose typical configuration is shown in FIG. 2, includes a digital control unit 3A, a 5 V regulator 3B, a reset circuit 3C, an oscillation circuit 3D, an input circuit 3E, a level shift circuit 3F and a VR conversion circuit and an MOSFET gate drive 3H.

The digital control unit 3A, which is constructed of e.g. a microcomputer, serves to control the entire operation of the wiper control apparatus.

The 5 V regulator 3B, to which a battery power supply voltage (e.g. 13.5 V) is supplied through an IG (ignition) switch 12 and a fuse 13 from a battery 11 which is a power source for a vehicle, serves to supply a driving voltage, e.g. 5 V for the digital control unit 3A.

The reset circuit 3C, when the power for the wiper control apparatus is turned on by turn-on of the IG switch 12, serve to reset the operation of the digital control unit 3A.

The oscillation circuit 3D serves to generate and supply a clock signal for the digital control unit 3A.

The input circuit 3E serves to detect the on/off of each of the INT terminal and ON terminal of the combination switch 2 and supply an INT mode ON signal and an ON mode ON signal to the digital control unit 3A.

The level shift circuit 3F converts the battery power supply voltage (13.5 V), detected at the WASH terminal of the combination switch 2 and the common terminal of the AS switch, into 5 V to be supplied to the digital control unit 3A.

Figure 12:
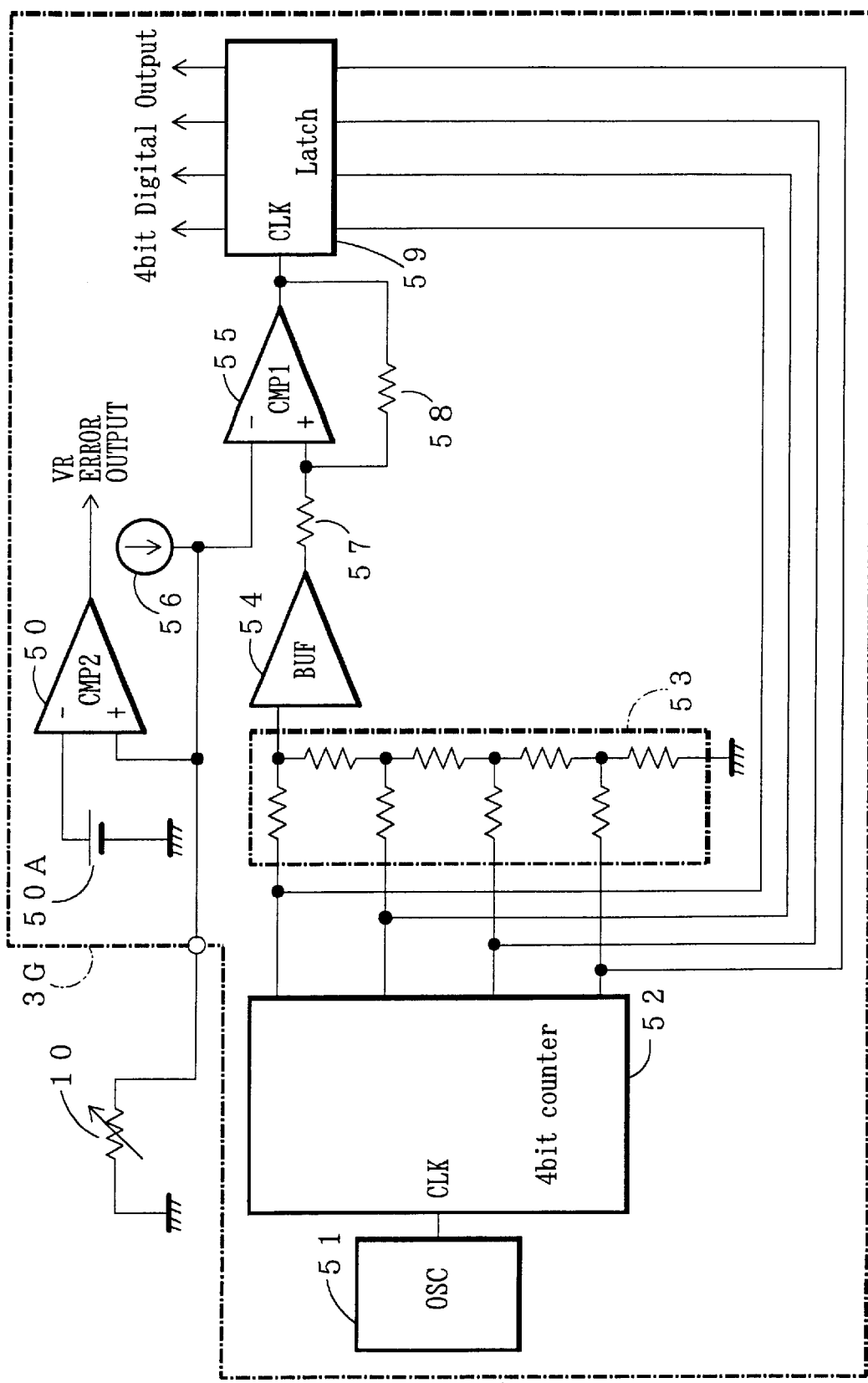
FIG. 12 is a block diagram of a typical configuration of a VR conversion circuit of a controller in the wiper control apparatus of FIG. 1.

The VR conversion circuit 3G is connected to the VR terminal of the combination switch 2, and serves to set the intermittent time during the INT mode. A typical configuration of the VR conversion circuit 3G is shown in FIG. 12.

The MOSFET gate drive 3H converts the digital output for controlling the MOSFET produced from the digital control unit 3A into an MOSFET operation level voltage which is outputted at control output terminals FET-a and FET-b.

The controller 3, under the control by the digital control unit 3A, performs an excellent timing control function during each operation mode on the basis of the timing chart as shown in FIGS. 5–11. The time control function has the characteristic functions listed as follows.

(Function A): function of forwarding the operation to the control units FET-a and FET-b with a time difference tb.

(Function B): function of continuing to produce the control output FET-a until the wiper returns to a park position when the combination switch 2 is turned off on the way of the wiper operation, for example.

(Function C): function of precisely defining the after-wash wiping after the wash operation by the number of times thereof.

(Function D): function of precisely defining the number of times of after-wash wiping even when the combination switch is changed from ON into OFF during the after-wash wiping after the wash operation.

(Function E): function of interrupting the control outputs FET-a and FET-b during the abnormal operation of the wiper motor 7 and restoring them after the abnormality is released.

(Function F): function of converting the resistance of a variable resistor 10 in a digital value to define the intermittent time precisely.

(Function G): function of setting the intermittent time at a prescribed value when the VR terminal of the combination switch 2 is released.

The details of each function will be explained later.

The MOSFET 4 is an N-channel type MOSFET, and serves as a semiconductor switch element for supplying or interrupting the driving voltage to the wiper motor 7 by means of its ON/OFF. The drain thereof is connected to the wiper motor 7, source thereof is connected to the GNT terminal of the combination switch 2 and ground, and the gate thereof is connected to the control output terminal FET-a of the controller 3.

The MOSFET 5 is a P-channel type MOSFET, and serves as a semiconductor switch element for performing the braking operation of the wiper motor 7 by means of its ON/OFF. The drain thereof is connected to a fuse 13 through a Zener diode 6, the source thereof is connected to the drain of the MOSFET 4, and the gate thereof is connected to the control output terminal FET-b of the controller 3.

The Zener diode 6 is selected to have a rating defined so that the Zener voltage satisfies a relationship: a battery voltage (e.g. 13.5 V)$<Vz<$the rating voltage $V_{DSS}$ of the MOSFET 4. In this way, the Zener diode 6 can have three functions of dissipating the reverse electric motive force of the wiper motor 7 when the MOSFET 4 is overheated and broken, protecting the MOSFET 4 when the battery 11 is connected inversely due to erroneous connection, and surely turning off the MOSFET 5 by shifting the gate potential by 7 V.

As for the wiper motor 7, its plus terminals is connected to the fuse 13 and the minus terminal is connected to the drain of the MOSFET 4.

As for the AS switch 8, as well known, as the wiper motor 7 rotates, its common contact a is connected to contact b (high level contact) when the wiper is at a park position, or connected to contact c (low level contact) when the wiper is at the other position than the park position.

As for the washer motor 9, its plus terminal is connected to the fuse 13 and the minus terminal is connected to the WASH terminal of the combination switch 2.

The normal operation of the wiper control apparatus according to the present invention having the configuration described above has three operations inclusive of an intermittent wiper operation, a continuous wiper operation and an after-wash wiping operation.

The individual operations will be explained below.

In an initial condition, the IG switch 12 is in an "ON" state and the wiper is at a park position. Therefore, the common contact a of the AS switch 8 is connected to the contact b. The control outputs from the controller 3 to the FETs 4 and 5 are "LOW" at both FET-b and FET-a so that the MOSFET 5 is "ON" and the MOSFET 4 is "OFF". Specifically, since the MOSFET 4 is an N-channel type, it turns "ON" when the control signal in a high level is supplied to the gate so that a current flows between the drain and source. The MOSFET 4 turns off when the signal in a low level is supplied to the gate. On the other hand, since the MOSFET 5 is of a P-channel type, it turns "ON" when the control signal in a low level is supplied to the gate, and turns off when the control signal in the high level is supplied to the gate. The control signal in the high or low level is set at a level sufficiently higher or lower than an operation threshold value of the pertinent MOSFET.

Intermittent Wiper Operation

Figure 5:
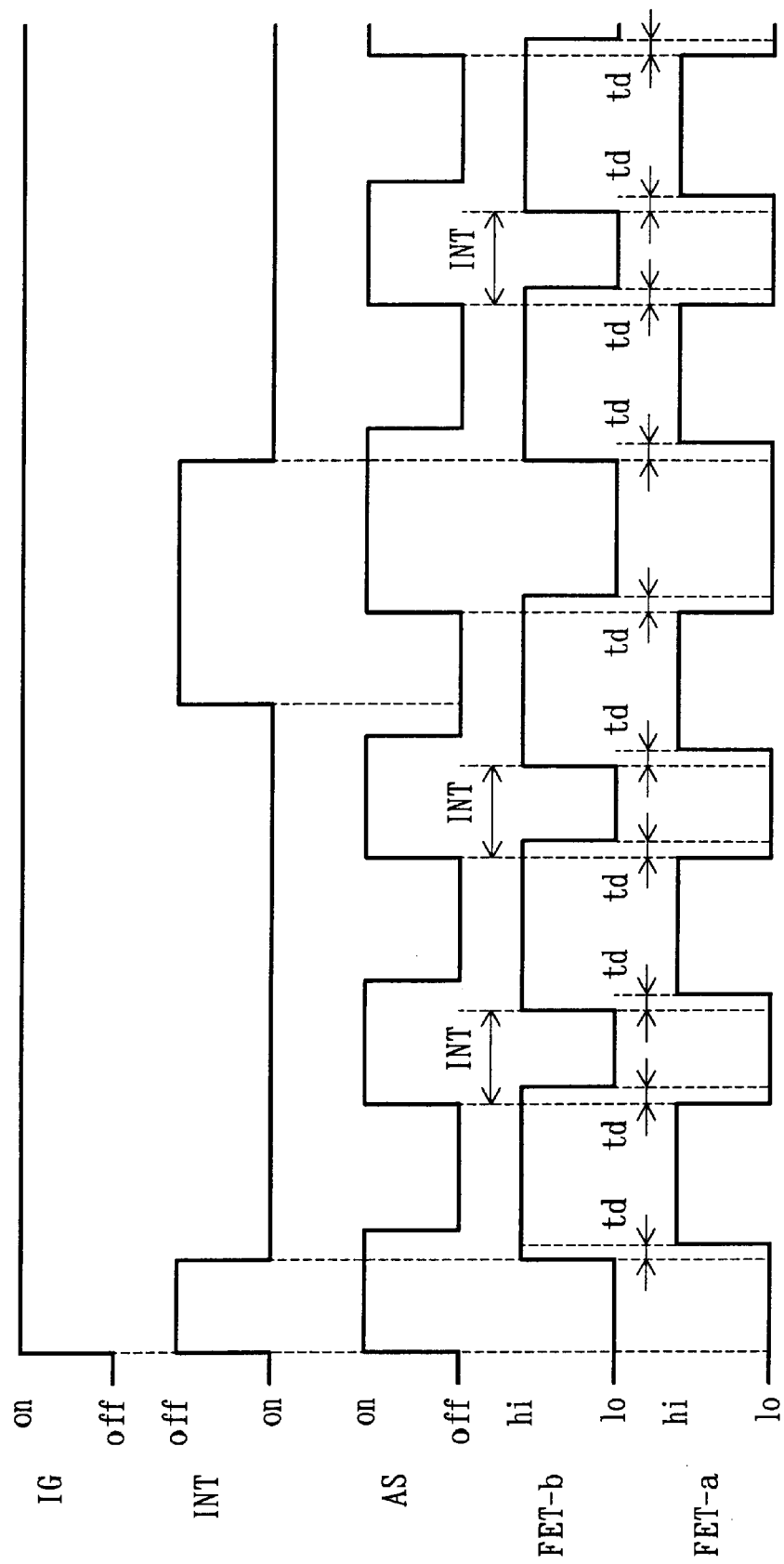
FIG. 5 is a timing chart of signals at respective points of the controller during the INT mode in the wiper control apparatus in FIG. 1.

Referring to FIG. 1 and FIG. 5 which is a timing chart of signals at respective points of the controller 3 in the INT mode in the wiper control apparatus in FIG. 1, an explanation will be given of the intermittent wiper operation.

When the combination switch 2 is changed into an INT position from the initial state, an INT "ON" signal (low level) is supplied from the combination switch 2 to the controller 3. When the controller 3 receives the INT "ON" signal, it changes the control output FET-b from a low level to a high level at a trailing edge of the INT "ON" signal, thereby controlling the MOSFET 5 to be "OFF". Subsequently, after dead time td elapses, the controller 3 changes the control output FET-b from the low level to the high level, thereby controlling the MOSFET 4 to be "ON".

As the function A of the controller 3, the dead time td is set for the purpose of preventing the MOSFET 5 and 4 from becoming "ON" and a tunneling current from flowing. The dead time may be set at a time sufficiently longer than the response time of an MOSFET.

When the MOSFET 4 turns on, a current flows along the passage of battery 11→IG switch 12→fuse 13→wiper motor 7→MOSFET 7→ground and the wiper motor 7 starts to rotate. In this case, the AS switch 8, which is synchronous with the rotation of the wiper motor 7, is changed from the high level contact b into the low level contact c so that the AS input to the controller 3 is changed from the high level into the low level. When the wiper makes a one round trip on a windshield glass as a result that the wiper motor 7 has continued to rotate, the wiper returns to the park position. Then, the AS switch 8 returns from the low level contact c to the high level contact b and the high level signal is supplied to the AS input of the controller 3.

When the high level signal is supplied to the AS input of the controller 3 again, the controller 3 changes the control output FET-a from the high level into the low level, thereby controlling the MOSFET 4 to be "OFF". Subsequently, after dead time td elapses, the controller 3 changes the control output FET-b from the low level to the high level, thereby controlling the MOSFET 5 to be "ON". The wiper motor 7, the energization of which is stopped by OFF of the MOSFET 4, generates a reverse electromotive force. However, since the MOSFET 5 turns on, a closed loop is formed consisting of the plus terminal of the wiper motor 7→Zener diode 6→MOSFET 5→minus terminal of the wiper motor. Therefore, a reverse current (braking current) flows abruptly through the wiper motor 7 to consume the reverse electric motive force. As a result, the wiper motor 7 is braked and stops abruptly, and hence the wiper stops without exceeding from the park position.

The MOSFET 5, which is always "ON" while the MOSFET 4 is OFF, can dissipate a surge voltage and take a low $V_{DS}$ voltage rating. By setting the $V_{DS}$ voltage rating of the MOSFET 5 at a value $2/3–1/3$ of that of the MOSFET 4, the MOSFET 5 can be down-sized and made inexpensive. In addition, the MOSFET 5 is adapted so that only the braking current when the wiper motor 7 is stopped flows. Since the braking current flows for a short time of several tens—several hundreds mili seconds, the $R_{DSON}$ rating of the MOSFET 5 is set at a large value of 2–20 times as large as that of the MOSFET 5. For this reason, the MOSFET 5 is further down-sized and made inexpensive.

The controller 3, after it has turned off the MOSFET 4, counts the INT time (time while the wiper stops) set by the variable resistor 10, and controls the MOSFET 5 from ON to OFF again. Thereafter, the controller 3 repeats the above operation. In this way, the intermittent wiper operation is performed.

During the intermittent wiper operation, when the combination switch 2 is changed from the INT position to the OFF position, the OFF signal (high level) is supplied to the INT input of the controller 3. In this case, if the wiper remains on the windshield glass and the AS switch 8 is located on the side of the low level contact c, since the AS input of the controller 3 is at the low level, the controller 3 keeps the control outputs FET-a and FET-b at the high level (above function B of the controller 3). Therefore, the MOSFET 4 remains ON and the MOSFET 5 remains OFF so that the wiper motor 7 continues to rotate. When the wiper returns to the park position and the As switch 8 is switched into the side of the high level contact b as a result that the wiper motor 7 has continued to rotate, the high level signal is supplied to the AS input of the controller 3. Then, the controller 3 immediately changes the control output FET-a from the high level to the low level, thereby turning off the MOSFET 4. After the dead time td has elapsed, the controller 3 changes the control output FET-b from the low level to the high level, thereby turning on the MOSFET 5. Thus, the wiper motor 7 ceases to rotate.

When the combination switch 2 is changed from the INT position to the OFF position, if the AS switch 8 is located on the side of the high level contact b (and hence the wiper is at the park position), the control signal at the low level from the controller 3 is immediately supplied to the MOSFET 4 and MOSFET 5. As a result, the MOFET 5 becomes ON and MOSFET 4 becomes OFF so that the wiper motor 7 immediately stops.

In this way, when the combination switch 2 is changed into the OFF position, at any position of the wiper, as long as the IG switch 12 is ON, the wiper necessarily stops at the park position. The AS switch 8 is only employed to detect the park position of the wiper and no driving current for the wiper motor 7 flows through the AS switch 8. Therefore, the AS switch can employ a contact of a small-current capacity type, and may be down-sized and inexpensive. In this case, reliability of its contact can be improved.

The intermittent (INT) time during the intermittent wiper operation can be set by the variable resistor 10 connected to the VR terminal of the combination switch 2. The resistance of the variable resistor 10 is converted into a digital value by a VR converter circuit 3G of the controller 3, whose configuration is shown in FIG. 12, and the converted digital value is sent to the digital control unit 3A. Thus, the intermittent (INT) time can be defined in a precise digital manner (function F of the controller 3).

More specifically, the VR converter circuit shown in FIG. 12 includes a comparator (COM2) 50, a reference voltage source 50A, a clock oscillator 51, a four-bit counter 52, a ladder circuit network 53, a buffer 54, a comparator (COM1) 55, a current source 56, resistors 57, 58, and a latch circuit 5. In the VR converter circuit of FIG. 12, the four-bit counter 52 always counts a fixed clock signal from the clock oscillator 51. The count value from the four-bit counter 52 is converted into an analog value by the ladder circuit network 53. The analog value is compared with the voltage obtained from the connecting point between the current source 56 and the variable resistor 10. If the voltage from the four bit counter 52 is larger than that from the variable resistor 10, the output from the comparator (COM1) 55 is inverted. The counted value at this time is latched by the latch 59.

By such an operation, as seen from the characteristic of the resistance value versus the A/D converted output, the resistance of the variable resistor 10 is converted into a digital value. The minimum digital value corresponds to the shortest intermittent time and the maximum digital value corresponds to the longest intermittent time. Incidentally, if the output from the comparator (COM1) 55 is not inverted, the resistance is converted into the maximum digital value.

Figure 13A:
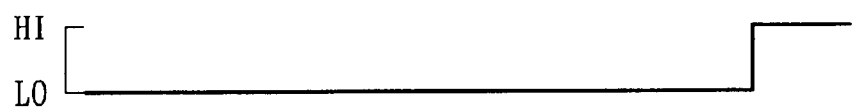
FIGS. 13A is a graph showing the error output characteristic of a VR conversion circuit in FIG. 12.
Figure 13B:
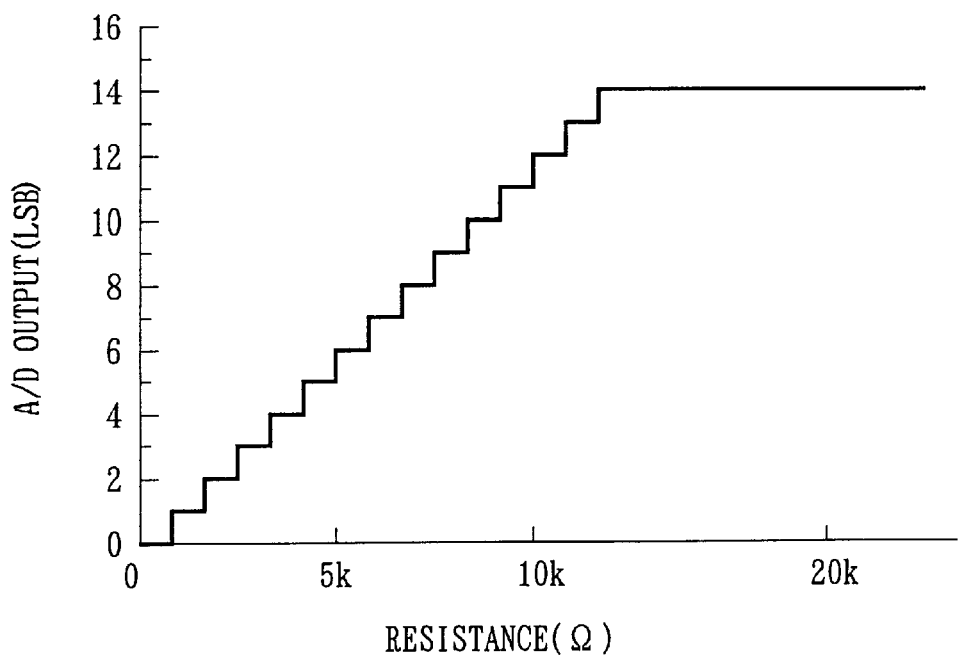
FIG. 13B is a resistance versus A/D conversion output characteristic.

The digital value should not be limited to four bits adopted in this example. Further, the minimum value of the variable resistor 10 maybe caused to correspond to the maximum intermittent time whereas the maximum value thereof may be caused to correspond to the minimum intermittent time.

Where the VR terminal of the combination switch 2 is released, the voltage obtained from the connecting point between the current source 56 and the variable resistor 10 is compared with the reference voltage from the reference voltage source 50A so that the output from the comparator (COM2) 50 is inverted to send a VR error output to the digital control unit 3A. In this case, as seen from FIG. 13A, when the error output at the high level from the comparator (COM2) 50 is supplied to the digital control unit 3A, the digital control unit 3A fixes the intermittent (INT) time at a prescribed value (function G of the controller 3). Thus, even when the VR terminal of the combination switch 2 is released, since the intermittent (INT) time is fixed at a prescribed value, occurrence of the event that the wiper does not move entirely can be avoided.

Continuous Wiper Operation

Figure 6:
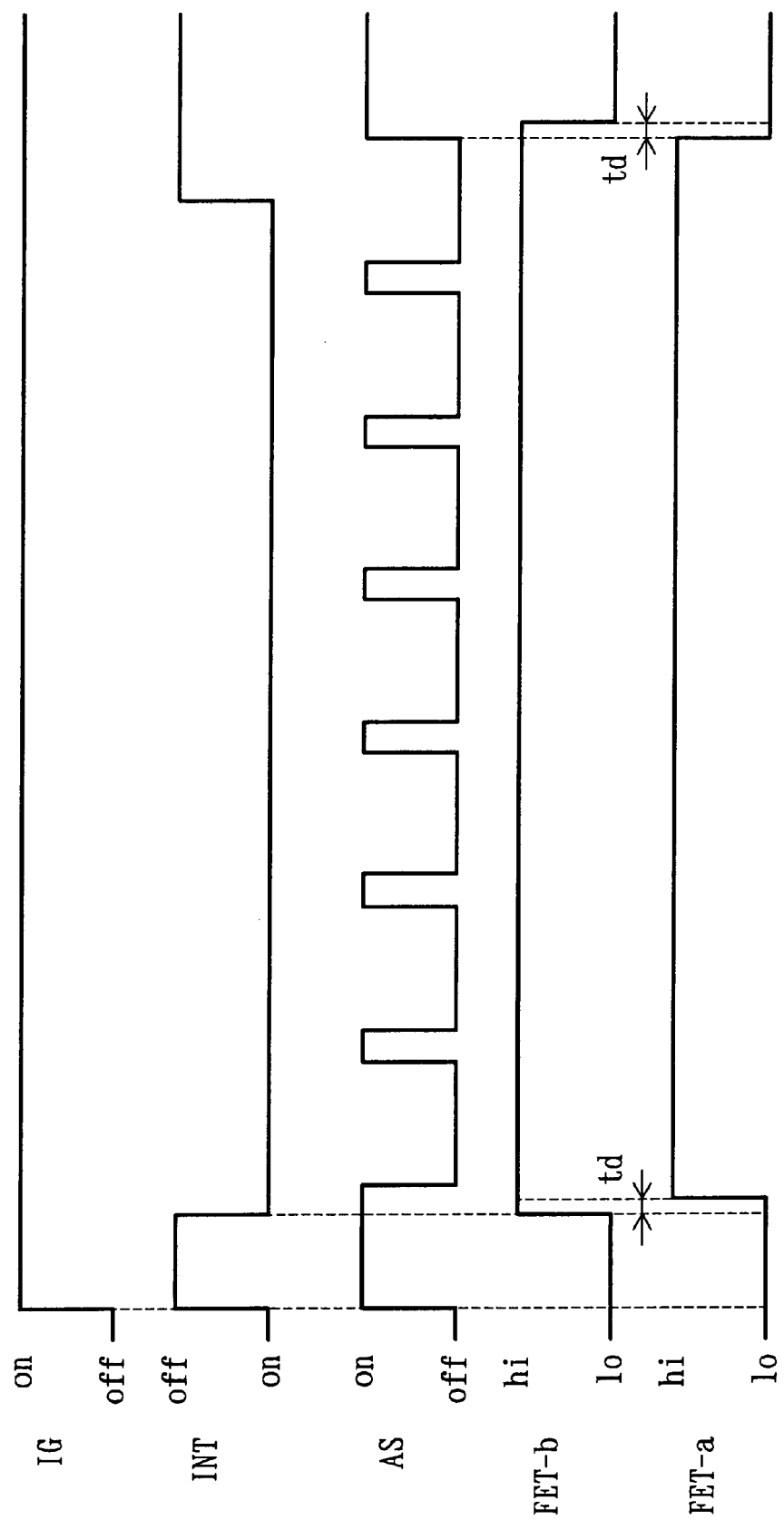
FIG. 6 is a timing chart of signals at respective points of the controller during the ON mode in the wiper control apparatus in FIG. 1.

Referring to the block diagram of FIG. 1 and the timing chart of signals at respective points of the controller 3 during this operation mode (ON mode) as shown in FIG. 6, an explanation will be given of the continuous wiper operation.

When the combination switch 2 is changed into the ON position from the initial state, the ON signal (low level) is supplied from the combination switch 2 to the ON input of the controller 3. Then, the controller 3 controls the MOSFETs 5 and 4 through the control outputs FET-a and FET-b so that the MOSFET 5 is immediately turned off and after elapse of the dead time td, the MOSFET 4 is turned on.

When the MOSFET 4 turns on, the wiper motor 7 starts to rotate. Then, since the AS switch 8, which is synchronous with the rotation of the wiper motor 7, is changed from the side of the high level contact b into the side of the low level contact c, the AS input to the controller 3 is changed into the low level. The wiper passes the park position whenever it reciprocates once on the windshield glass. At this time, the AS switch 8 temporarily returns to the high level contact b, and hence the high level signal is supplied to the AS input of the controller 3. However, the controller 3 continues to supply the control signal at the high level to the gates of the MOSFETs 4 and 5. Therefore, the wiper motor 7 continues to rotate.

When the combination switch is changed from the ON position into the OFF position, the OFF signal (high level) is supplied to the ON input terminal of the controller 3. At this time, if the wiper remains on the windshield glass and the AS switch 8 is located on the side of the low level contact c, the controller 3 keeps the control signal output to the MOSFETs 4 and 5 at the high level. Therefore, the wiper motor 7 continues to rotate and the wiper returns to the park position. Then, since the high level signal is supplied to the controller 3, the controller 3 controls the MOSFETs 4 and 5 through the control outputs FET-a and FET-b so that the MOSFET 4 is immediately turned off and after elapse of the dead time td, the MOSFET 5 is turned on. Thus, the rotation of the wiper motor is stopped. The braking operation will be carried out in the manner described above.

Figure 7:
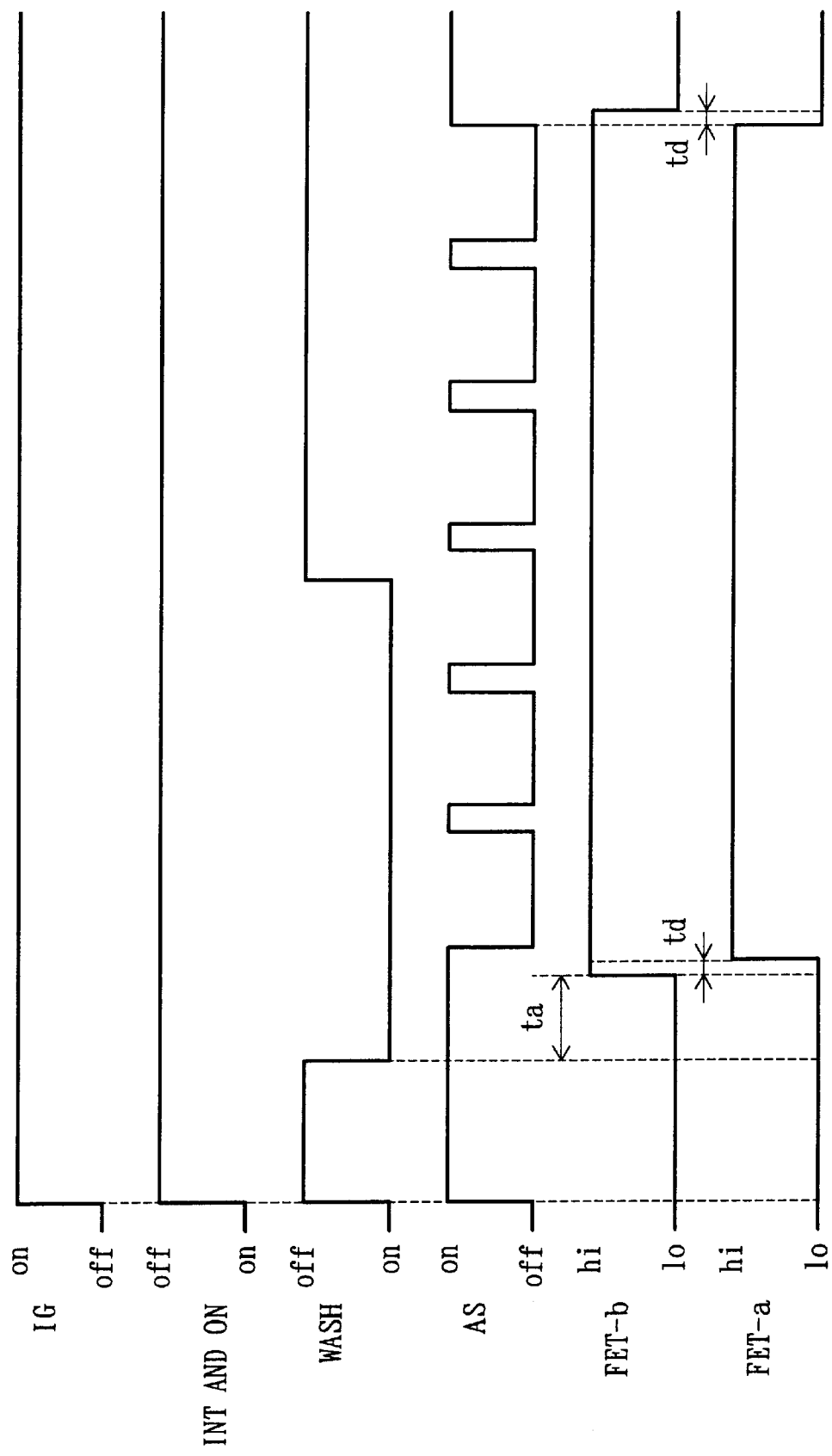
FIG. 7 is a timing chart of signals at respective points of the controller during the WASH mode in the wiper control apparatus in FIG. 1.

Referring to the block diagram of FIG. 1 and the timing chart of signals at respective points of the controller in the WASH mode shown in FIG. 7, an explanation will be given of the after-wash wiping operation.

When the combination switch 2 is changed from the OFF position into the WASH position, a current flows on the battery 11→IG switch 12→fuse 13→washer motor 9→WASH terminal of the combination switch 2→GND terminal→ground. As a result, the washer motor 9 starts to rotate. The washer motor 8 operates a pump (not shown) so that a washing liquid is sent from a washing liquid tank (not shown) onto the windshield glass.

At this time, at the same time as energization of the washer motor 9, the ON signal (low level) is supplied to the WS input of the controller 3. When a delay time ta elapses from the trailing edge of the ON signal, the controller 3 changes the control output FET-b from the low level to the high level, thereby turning off the MOSFET 5. After elapse of the dead time td, the controller 3 changes the control output FET-a from the high level to the low level, thereby turning on the MOSFET 4. When the MOSFET 4 is turned on, the wiper motor 7 starts to rotate. The wiper makes a reciprocating movement on the windshield glass to wash the windshield glass by the washing liquid. During the period while the combination switch 2 is at the WASH position, the controller 3 continues to supply the high level control signal to the MOSFETs 4 and 5. The delay time ta is set assuming the time taken from when the washer motor 9 starts to rotate to when the washing liquid reaches the windshield glass.

When the combination switch 2 is changed from the WASH position to the OFF position, the OFF signal is supplied to the WS input terminal of the controller 3. After the OFF signal has been supplied to the WS input terminal, the controller 3 confirms that the AS input from the AS switch 8 has returned from the low level to the high level, and continues to supply the high level control signal to the MOSFETs 4 and 5 until the wiper reciprocates a prescribed number of times, e.g. three times (i.e. switching of the AS switch 8 from the low level contact c into the high level contact b is counted three times), and thereafter supplies the low level control signal so that the MOSFET 4 is turned off to stop the wiper at the park position.

The controller 3 monitors the number of times of switching from the low level contact c of the AS switch 8 to the high level contact b thereof in terms of the AS input and compares it with the prescribed number of times stored in an internal memory. If they are coincident to each other, the controller 3 changes the control outputs FET-a and FET-b from the high level to the low level so that energization of the wiper motor 7 is stopped.

Therefore, in the after-wash wiping operation, the combination switch 2 is set at the WASH position to perform the washer operation. When the combination switch 2 is set at the OFF position to stop the washer operation, the wiping is performed a prescribed number of times (function C of the controller 3).

On the other hand, where the combination switch 2 is changed from the WASH position to the ON position, the controller 3 continues the wiper operation. Where the combination switch 2 is changed from the WASH position to the ON position and further to the OFF position, if the prescribed number of times (three times in this example) is not reached, the controller 3 controls the wiper to perform the remaining number of times of wiping and thereafter stop at the park position (function D of the controller 3).

The wiper control apparatus according to the invention performs the protection operation when the wiper motor 7 has fallen into the abnormality such as locking or shorting.

In the embodiments described below, a process will be explained in which lock abnormality occurs on the way of a single reciprocating operation, the cause of locking is removed after the protection operation, and the wiper carries out the remaining number of times of wiping and stops at the park position.

First Example of Protection Operation

Figure 8:
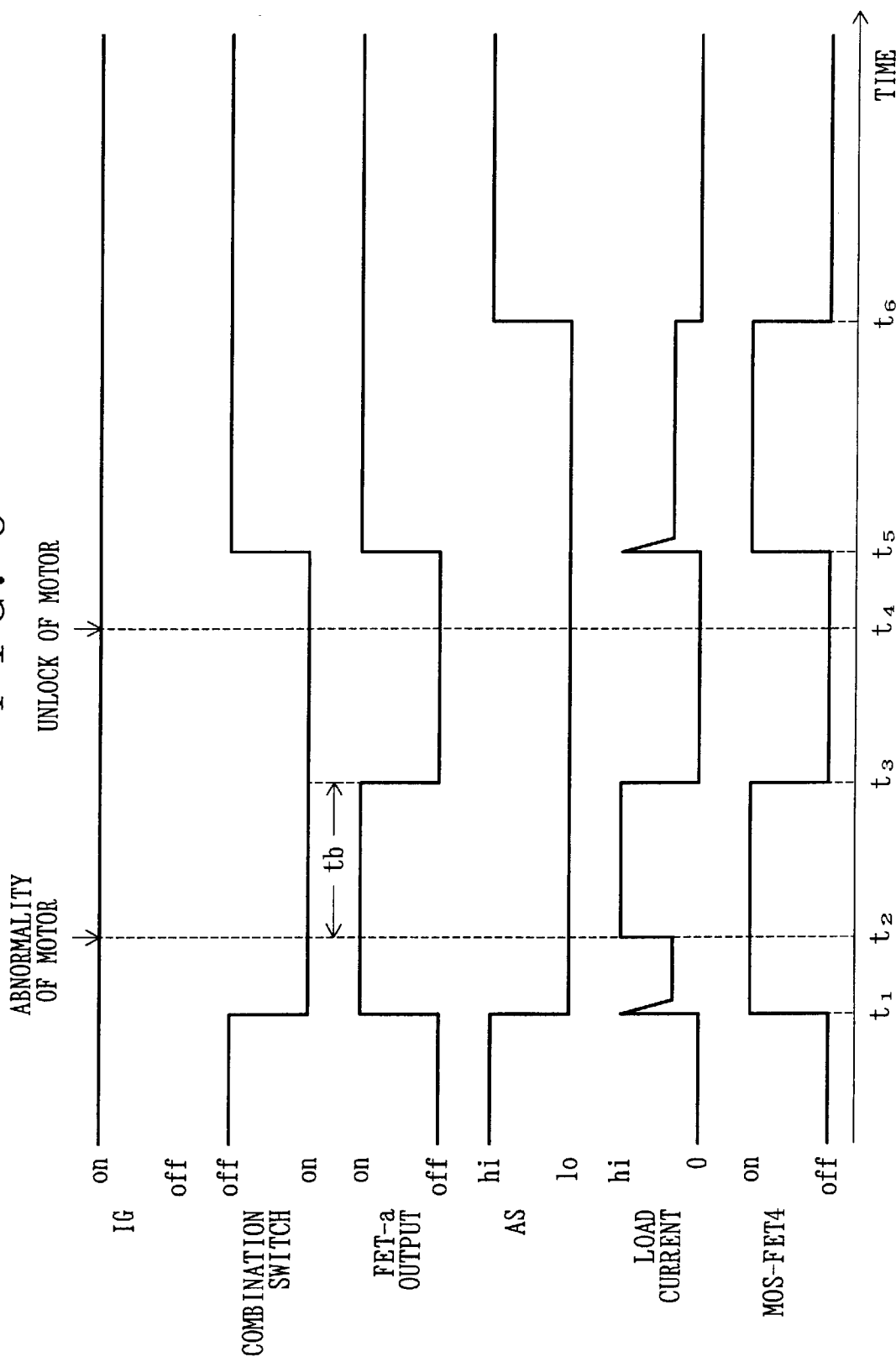
FIG. 8 is a timing chart of signals at respective points of the wiper control apparatus for explaining the first example of a protection operation.

Referring to the block diagram of FIG. 1 and the timing chart of signals at respective points of the wiper control apparatus for explaining the first example of a protection operation shown in FIG. 8, an explanation will be given of the first example as a function E of the controller 3.

At timing t1, when the combination switch 2 is changed from the OFF position to the INT position or ON position, the ON signal (low level) from the combination switch 2 is supplied to the controller 3. Thus, the control output FET-a from the controller 3 is changed from the low level into the high level, thereby turning on the MOSFET 4. Then, energization of the wiper motor is started so that the wiper motor rotates.

While the wiper motor 7 rotates, at timing t2, when it is subjected to abnormality such as locking or short, the wiper motor 7 ceases to rotate, and a large current continues to flow through the wiper motor 7. In this case, since the wiper motor 7 remains stopped, the AS switch 8 remains at the low level contact.

Using an internal counter (not shown), the controller 3 counts the time elapsed from when the control output FET-a has been changed to the high level. If the controller detects that the AS switch 8 has not been changed for a period (hereinafter referred to as abnormality detecting period tb) which is sufficiently longer than the period for the wiper normally taken to make single reciprocation and return to the park position, it forcibly changes the control output FET-a from the high level to the low level. Thence, the MOSFET 4 is turned off so that energization of the wiper motor 7 is interrupted when the abnormality detecting period tb (=t3−t2) has elapsed from occurrence of the abnormality, thereby preventing a large load current from continuing to flow through the wiper motor 7.

Thereafter, when the abnormality such as the locking and short is removed, the position of the combination switch 2 is changed. The controller 3 detects this to change the control output FET-a from the low level to the high level. Thus, the wiper motor 7 is energized so that the wiper is operated in the operation mode corresponding to the present position of the combination switch 2 (Incidentally, FIG. 8 shows the case where the combination switch 2, after the motor locking has been removed at timing t4, is changed from the ON or INT position to the OFF position at timing t5, and hence at timing t6, the wiper is returned to the park position).

If the locking is not still removed when the combination switch 2 has been changed at timing t3 or later, after the abnormality detecting time tb elapses from the timing of changing the position, the controller 3 forcibly changes the control output FET-a from the high level to the low level again, thereby preventing the large load current from continuing to flow through the wiper motor 7.

The configuration and operation of the wiper control apparatus according to the present invention provides the following advantages.

(1) Since the $V_{DS}$ voltage rating of the MOSFET 5 for braking is set at a small value which is $2/3$–$1/3$ of that of the MOSFET 4 for driving the wiper motor and the RDSON rating of the MOSFET 5 is set at a large value which is 2–20 times as large as that of the MOSFET 4, the MOSFET 5 can be down-sized and made inexpensive.

(2) Since only the braking current flows through the Zener diode 6 for current blocking when the battery is reverse-connected and through the MOSFET 5, the current capacity of the Zener diode 6 can be made small. Therefore, the Zener diode can be made down-sized and inexpensive.

(3) Since the control outputs FET-a and FET-b of the controller 3 are supplied to the MOSFETs 4 and 5 with a time difference td between their times of rising and falling, no tunneling current flows and unnecessary heat and noise dissipation is removed.

(4) When the combination switch 2 is turned off on the way of the wiper operation, the controller 3 continues to issue the control output FET-a until the wiper returns to the park position in such a manner that the signal current is caused to flow through the AS switch 8 of the wiper motor switch 7. For this reason, the AS switch 8, MOSFET 5 and Zener diode 6 can be down-sized and made reliable.

(5) Since the wiping after the washing has been made is defined by the number of times, an error therefor can be removed.

(6) When the combination switch 2 is changed from the ON position to the OFF position during the wiping after the washing, since the number of times of wiping is defined accurately, an error therefor can be removed.

(7) When the abnormality of the wiper motor 7 occurs, energization of the wiper motor 7 is interrupted. After the abnormality is removed, the energization is restored. For this reason, excessive up-sizing of the MOSFET can be avoided. Namely, the MOSFET can be down-sized and made inexpensive. In addition, the reliability of the wiper control apparatus inclusive of the driving circuit and motor can be improved.

(8) The resistance of the variable resistor is converted into a digital value to define the intermittent time accurately. This improves the timing accuracy of the intermittent wiper operation.

(9) When the VR terminal of the combination switch 2 is released, the intermittent time is accurately defined at a prescribed time by the controller 3. This improves the timing accuracy of the intermittent operation.

Although several embodiments were explained, the present invention should not be limited to them, but can be realized in several modifications and applications.

For example, the dead time td was set at the equal values for that (td1) when the control output FET-b is changed from the low level to the high level and subsequently the control output FET-a is changed likewise, and that (td2) when the control output FET-a is changed from the high level to the low level and subsequently the control output FET-b is changed likewise. They may be individually set at optimum values.

The function E of the controller 3 was explained as the first example of the protection operation, but can be realized also as the following second example of the protection operation.

Second Example of the Protection Operation

Figure 9:
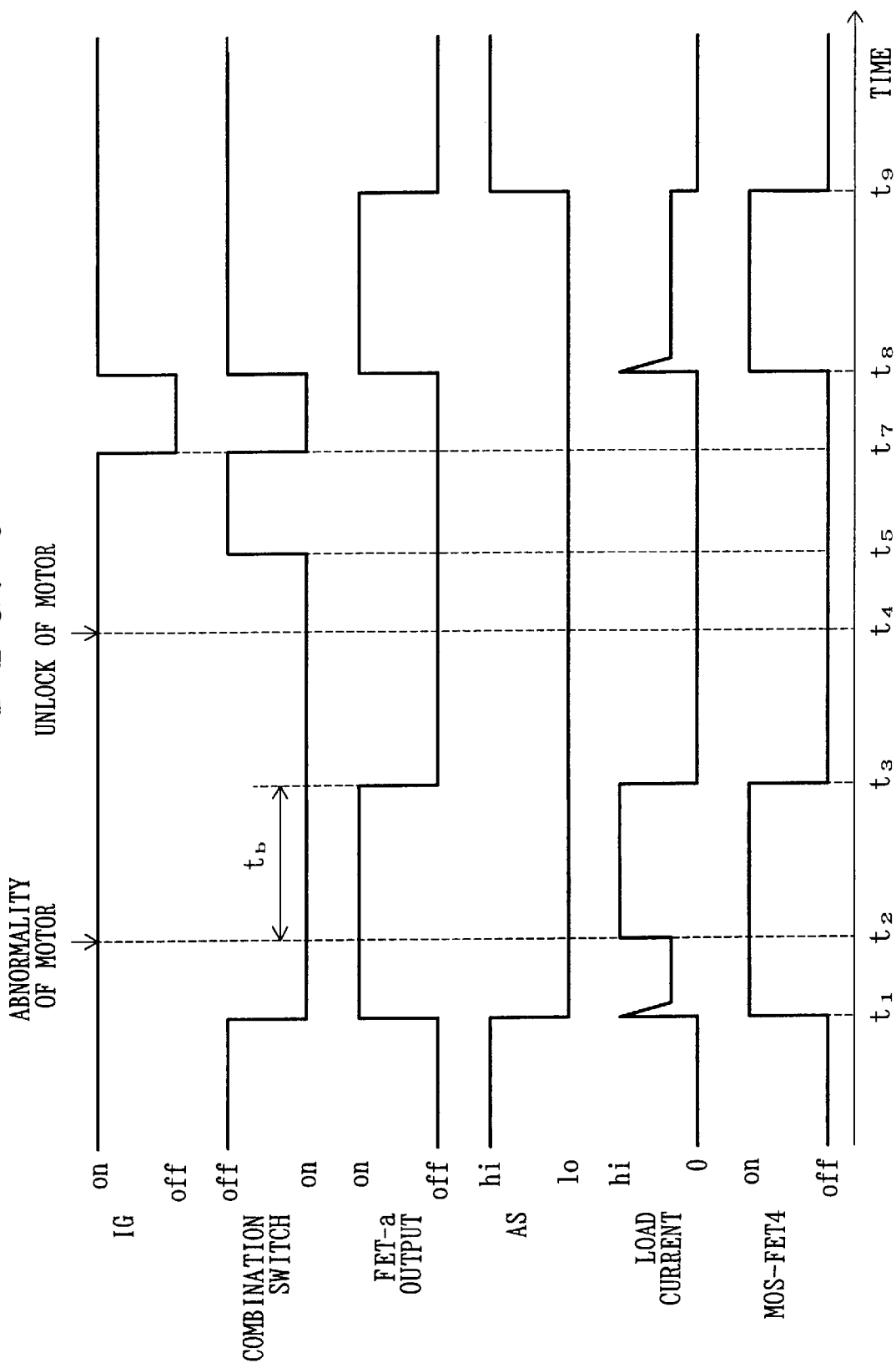
FIG. 9 is a timing chart of signals at respective points of the wiper control apparatus for explaining the second example of a protection operation.

Referring to the block diagram of FIG. 1 and the timing chart of signals at respective points of the wiper control apparatus for explaining the second example of a protection operation shown in FIG. 9, an explanation will be given of the second example of the protection operation.

The second example of the protection operation is similar to the first example in that the changing time of the AS switch 8 is monitored to interrupt energization of the wiper motor 7, but is different from the latter in the operation after the abnormality such as locking or short has been removed.

Specifically, after the abnormality has been removed, i.e. the locking of the wiper motor 7 has been released, the controller 3 does not detect the position change of the combination switch 2 unlike the first protection operation (for example, in FIG. 8, at timing t5, the combination switch has been changed into the OFF position), once turns off the IG switch at timing t7 and turns on it again at timing t8 (i.e. detects off/on of the IG switch 12). Then, the controller 3 restores the original operation before the abnormality occurs, and returns the wiper to the park position at timing t9.

In this way, the controller 3 interrupt energization of the wiper motor when its abnormality such as its locking and restores the energization by turning on again the IG switch after the abnormality has been removed, thereby resuming the original operation.

Figure 3:
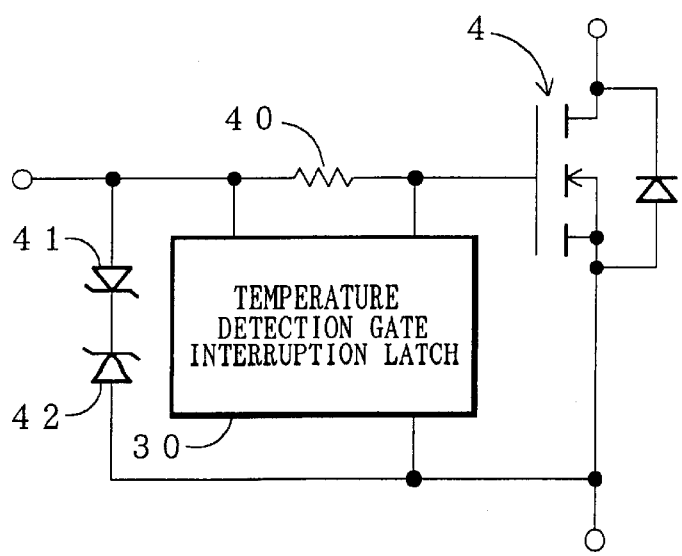
FIG. 3 is a circuit diagram of another embodiment of the wiper control apparatus according to the present invention.

In another embodiment of the wiper control apparatus according to the present invention, as shown in FIG. 3, a gate circuit for the N-channel MOSFET 4, which serves as a semiconductor switch for supplying or interrupting the driving voltage applied to the wiper motor 7, is provided with an over-heating interruption/protection circuit 30. The over-heating interruption/protecting circuit 30 includes a temperature detecting circuit, a gate interruption circuit and a latch circuit.

Figure 4:
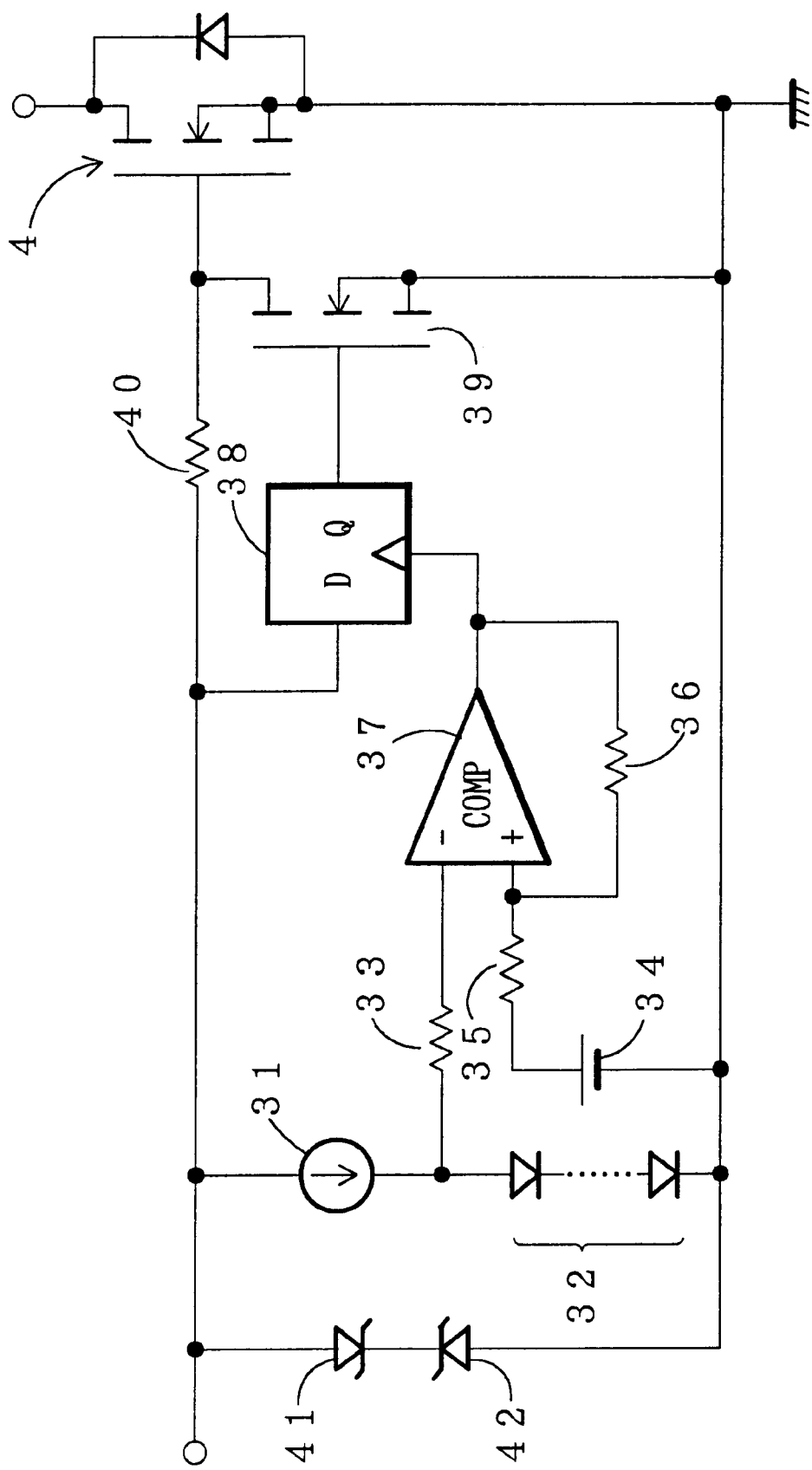
FIG. 4 is a circuit diagram of an actual configuration of an overheating interruption/protection circuit in FIG. 3.

More specifically, in the over-heating interruption/ protection circuit 30, as seen from FIG. 4, the temperature detecting circuit comprises a current source 31, a temperature detecting portion 32, a resistor 33, a reference voltage source 34, a resistor 35 and a comparator 37. The current source 31 is connected to the gate of the MOSFET 4 to which the control signal is supplied from the control output FET-a of the controller 3 through a resistor 40. The temperature detecting portion 32 comprises a plurality of diodes connected in series for detecting heat dissipation of the MOSFET 4. The connecting point of the current source 31 and the temperature detecting portion 32 is connected to the minus input terminal of the comparator 37 through the resistor 33. A reference voltage source 34 is connected to the comparator 37 through the resistor 35. In operation, the comparator 37 compares the voltage at the connecting point supplied to the minus terminal and the reference voltage from the reference voltage source 34 supplied to the plus terminal to produce a comparison result as a temperature detected output.

The clock input terminal of a D-type FF (flip-flop) serving as the latch circuit is supplied with the temperature detected output from the temperature detecting circuit. The D input terminal of the D-type FF is supplied with the control signal from the control output FET-a of the controller 3. The output from the Q output terminal of the D-type FF is supplied to an N-channel MOSFET 39 which is connected between the source and gate of the MOSFET 4 and serves as the gate interruption circuit. Zener diodes 41 and 42 which are reverse-connected constitute an excessive voltage protection means for preventing an excessive voltage from being applied to the MOSFET 4. Incidentally, the D-type FF 38 can be omitted. In this case, the temperature-detected output from the temperature detecting circuit causes the N-channel MOSFET 39 serving as the gate interrupting circuit to perform the interruption operation directly.

When the wiper motor produces the abnormality such as locking or short while it is energized, a large current flows through the MOSFET 4. In this case, a voltage based on the heat dissipation of the MOSFET 4 is detected by the temperature detecting portion 32. If the voltage detected by the temperature detecting portion 32 exceeds the reference voltage from the reference voltage source 32, the high level output which is a comparison result by the comparator 37 is supplied to the clock input terminal of the D-type FF 38. Thence, the high level output from the Q output of the D-type 38 is applied to the gate of the MOSFET 39 so that the MOSFET 39 turns on. When the MOSFET 39 turns on, the gate potential of the MOSFET 4 becomes the low level so that the MOSFET 4 turns off. Thus, the energization of the wiper motor 7 is interrupted.

A concrete example of the protection operation by the over-heating interruption protection circuit 30 will be explained as the third example of the protection operation.

Third Example of the Protection Operation

Figure 10:
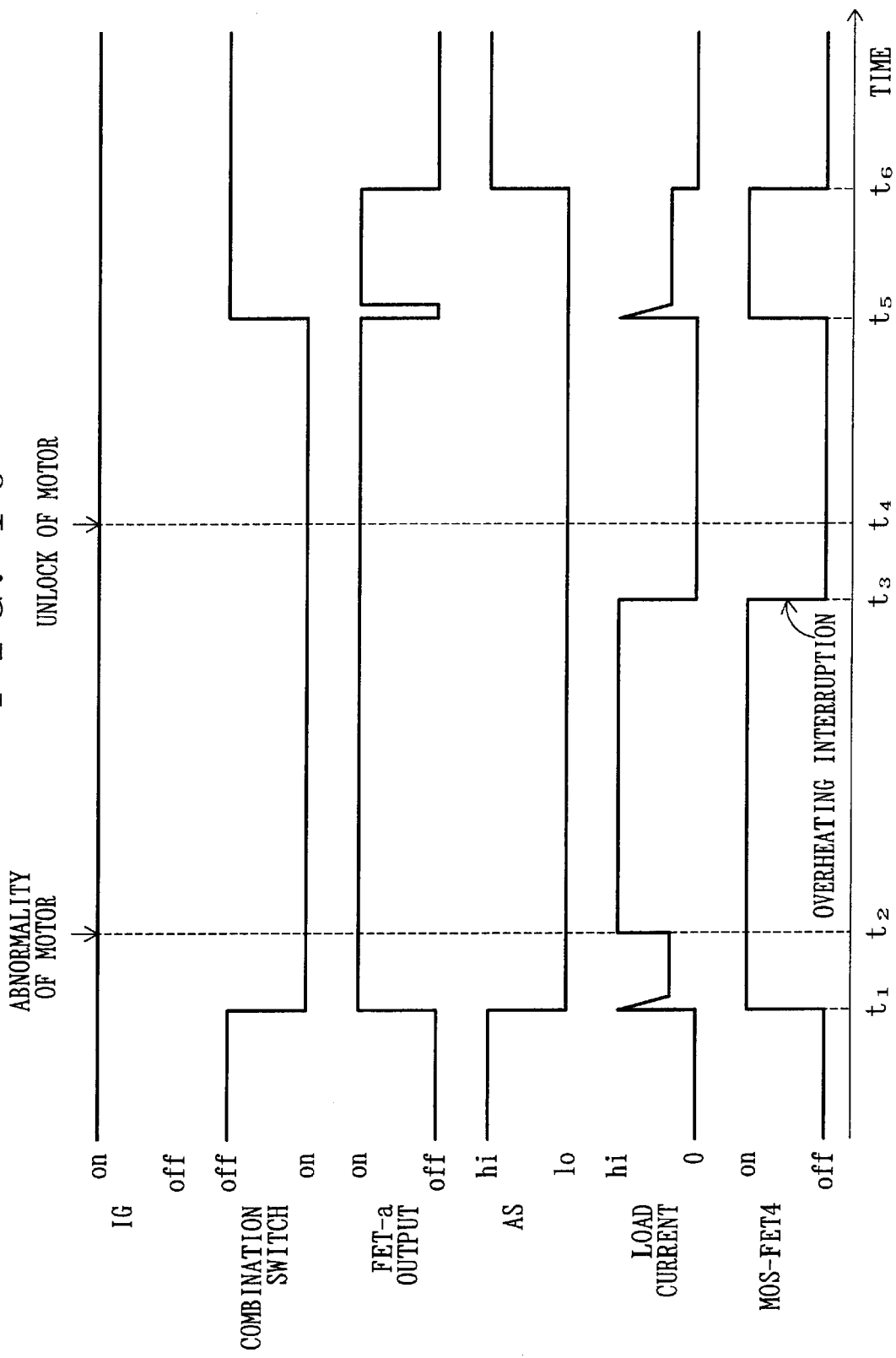
FIG. 10 is a timing chart of signals at respective points of the wiper control apparatus for explaining the third example of a protection operation.

An explanation will be given of the third protection operation referring to the block diagram of FIG. 1, over-heating interruption/protection circuit 30 shown in FIGS. 3 and 4 and the timing chart of signals at respective points of the wiper control apparatus for explaining the third example of the protection operation shown in FIG. 10.

The third example of the protection operation is the same as the first example of the protection operation until the combination switch 2 is changed from the OFF position to the INT or ON position and the AS switch 8 remains at the low level contact c owing to locking of the wiper motor. Since a large current continues to flow owing to the locking, the MOSFET 4 generates heat. At a certain timing (t3 in FIG. 10), the MOSFET 4 is self-interrupted by the function of the over-heating interruption/protection circuit 30. As a result, energization of the MOSFET 4 and wiper motor 7 is ceased. In this case, if the cause of the motor locking is removed, the controller 3 changes the control output FET-a into the low level once according to the position change of the combination switch 2 (timing t5). Thereafter, the wiper will operate in the operation mode after the combination switch 2 has been changed in position.

Because of the position change of the combination switch 2, the period while the control output of the controller 3 is at the low level may be a short time enough to dissolve the latch of the D-type FF 38 serving as a latch circuit for the MOSFET 4. In the normal operation, although the interruption of the output attendant to the change of the combination switch 2 is always carried out, an inconvenience such as delay of the operation does not actually occur.

As described above, before the MOSFET 4 is broken owing to its overheating, the over-heating interruption/ protection circuit 30 turns off the gate of the MOSFET 4 and stops the energization thereof. Namely, when the abnormal current continue to flow, the current is interrupted quickly so that the current rating of the MOSFET 4 is not required to be excessively large. Thus, the MOSFET 4 can be down-sized and made inexpensive. The reliability of the apparatus inclusive of the driving circuit and motor can be improved.

The over-heating interruption/protection circuit 30 may be added on the basis of the following fourth protection operation in place of the third protection operation.

Fourth Example of the Protection Operation

Figure 11:
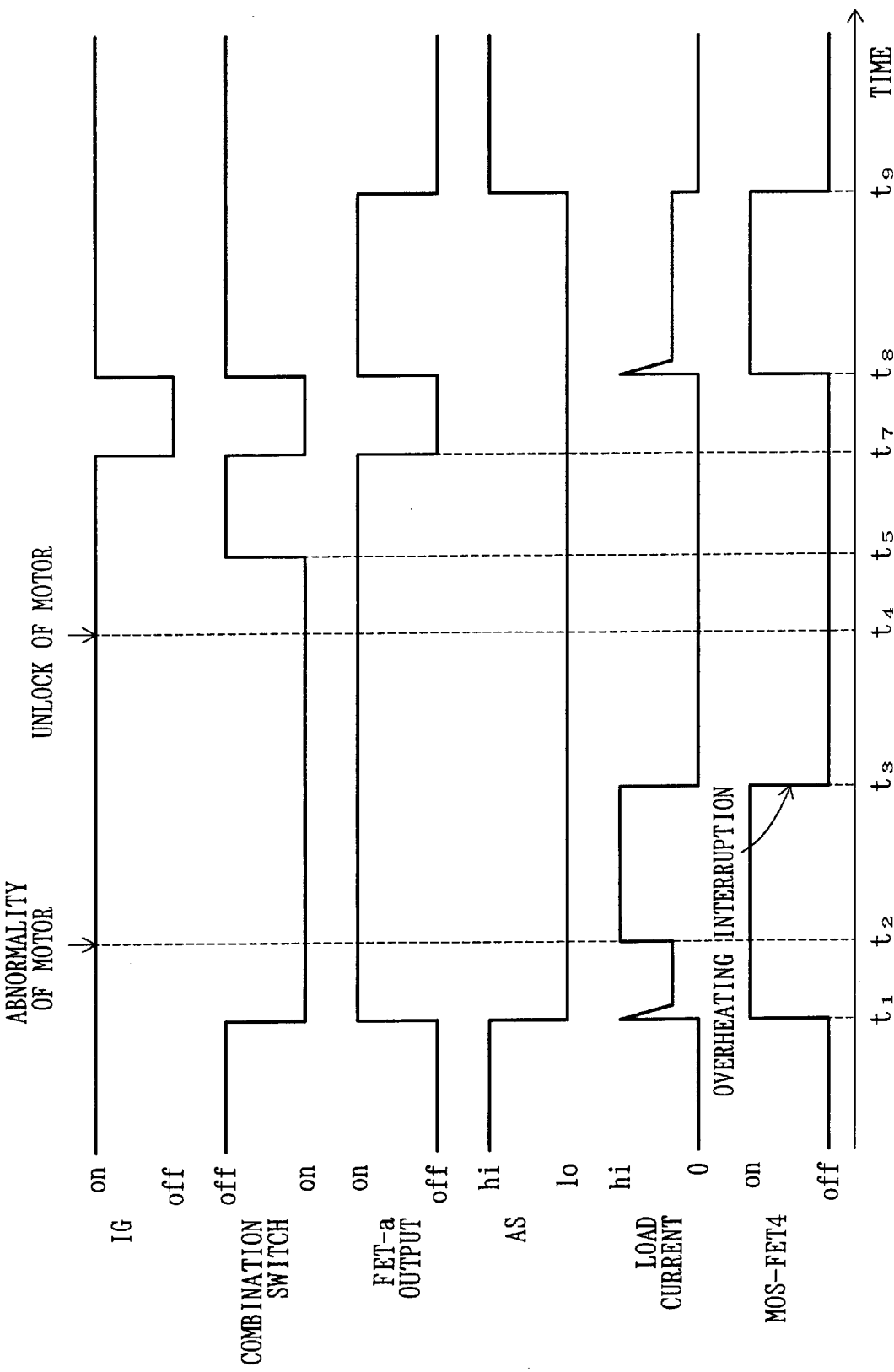
FIG. 11 is a timing chart of signals at respective points of the wiper control apparatus for explaining the fourth example of a protection operation.

An explanation will be given of the fourth protection operation referring to the block diagram of FIG. 1, over-heating interruption/protection circuit 30 shown in FIGS. 3 and 4 and the timing chart of signals at respective points of the wiper control apparatus for explaining the third example of the protection operation shown in FIG. 11.

The fourth protection operation is the same as the above third protection operation in that the MOSFET 4 is self-interrupted owing to its overheating. However, the operation after the abnormality such as locking or short has been removed is different from that in the third protection operation but the same as that in the second protection operation.

Specifically, after the abnormality has been removed, i.e. the locking of the wiper motor 7 has been removed, the controller 3 does not detect the position change of the combination switch 2 unlike the first protection operation (for example, in FIG. 8, at timing t5, the combination switch has been changed into the OFF position), once turns off the IG switch at timing t7 and turns on it again at timing t8 (i.e. detects off/on of the IG switch 12). Then, the controller 3 restores the original operation before the abnormality occurs, and returns the wiper to the park position at timing t9.

In this way, the MOSFET 4 for driving the wiper motor 7 is self-interrupted when it is overheated so that the energization of the wiper motor 7 is interrupted. The controller 3 restores the energization by turning on again the IG switch 12 after the abnormality has been removed, thereby resuming the original operation.

Through each of the protection operations, the abnormal current ceases to flow through the wiper motor so that the reliability of the motor, wire and connector can be improved. The various kinds of protection operations may be combined as occasion demands.

Figure 14:
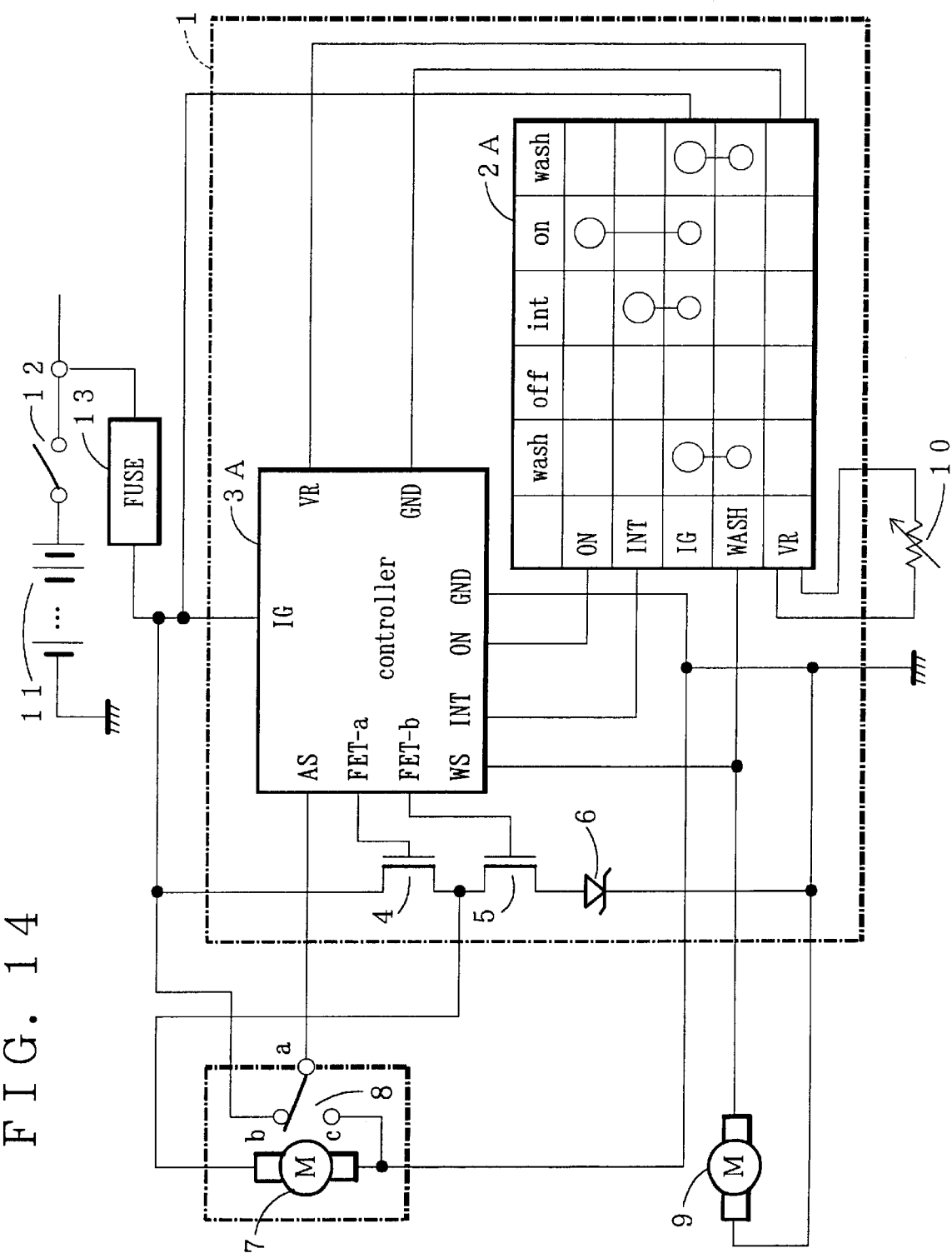
FIG. 14 is a block diagram showing another embodiment of the wiper control apparatus according to the present invention, i.e. a high-side switch type wiper control apparatus.

In the above embodiment, although the MOSFET 4 serving as a semiconductor switch element for driving the wiper motor is arranged on the downstream side (low side) of the wiper motor 7, as another embodiment, as shown in FIG. 14, the MOSFET 4 may be arranged on the upstream side (high side) of the wiper motor 7.

In this case, the MOSFET 4 is a P-channel type MOSFET whereas the MOSFET 5 is a N-channel type MOSFET. Both MOSFETs 4 and 5 have the ON/OFF relationship for "high" and "low" of a signal which is reverse to the case of FIG. 1. A Zener diode 6 is connected between the source of the MOSFET 5 and ground. The combination switch 2A has an IG terminal connected to the fuse 13 in place of the GND terminal of the combination switch 2 of FIG. 1. The controller 3A is provided with a GND port added to the configuration of the controller 3 shown in FIG. 1.

The high-side switch type of wiper control apparatus shown in FIG. 14 has the same advantage as that for the low-side switch type of wiper control apparatus shown in FIG. 1. In addition, the MOSFET 4 for driving the wiper motor may be connected to the over-heating interruption/protection circuit 30 which is arranged on the upstream side of the wiper motor 7 so that the protection against the failure such as wire shorting can be implemented, thereby improving the safety of the apparatus.

In a further embodiment, the wiper control apparatus according to the invention can be applied to a control apparatus combined with a relay. Where two systems of wipers are installed in a vehicle, the wiper control apparatus according to the present invention can be adopted in the one system and the relay type wiper control apparatus according the prior art can be adopted in the other system.

Figure 15:
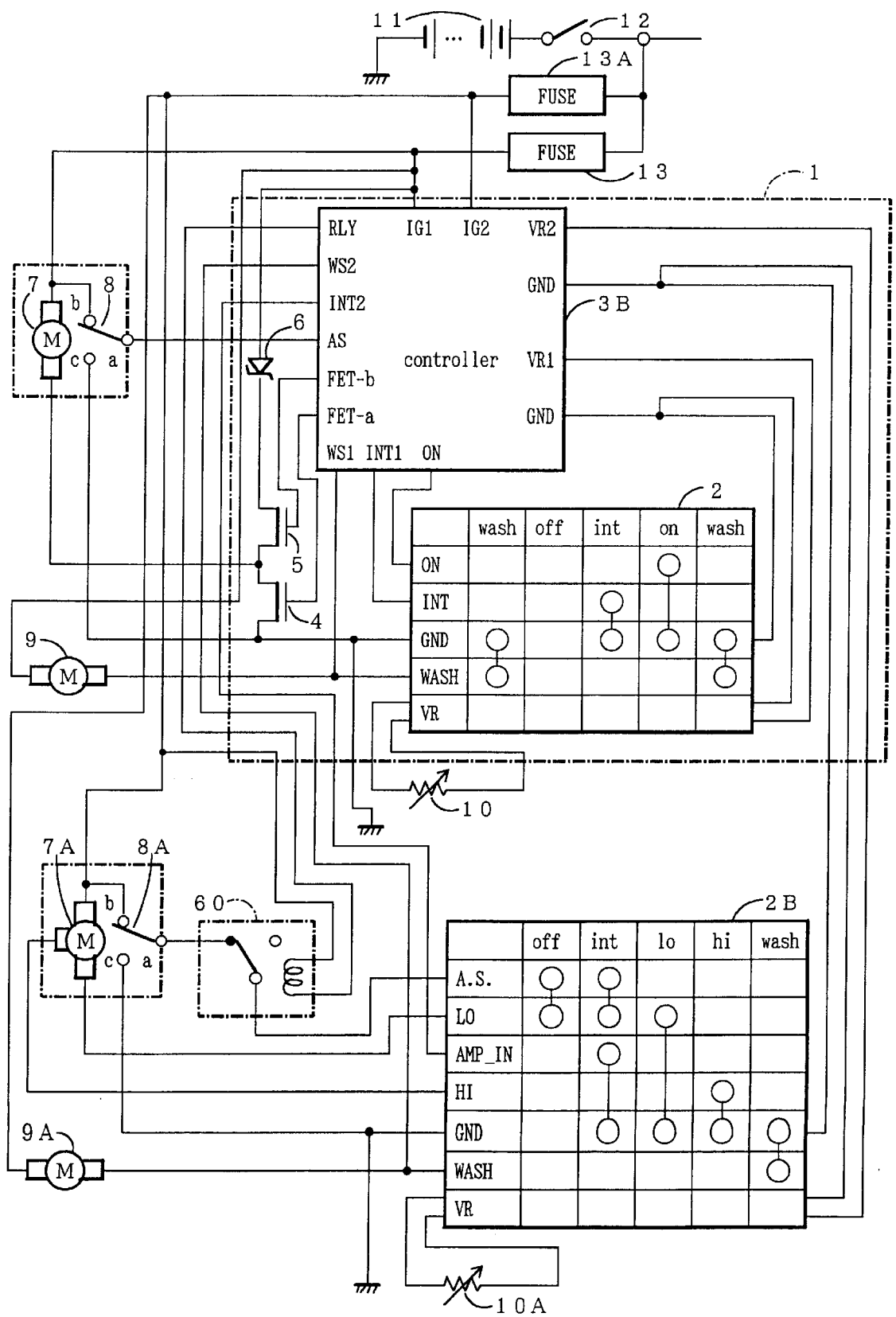
FIG. 15 is a block diagram showing still another embodiment of a wiper control apparatus according to the present invention, i.e. a combination with a relay wiper control apparatus.

In this case, as seen from FIG. 15, the wiper control apparatus according to the present invention and the relay-type wiper control apparatus are combined with each other. The former comprises a control section 1 including a combination switch 2, controller 3B, MOSFETs 4, 5 and a Zener diode; a wiper motor 7, an AS switch 8 and a washer motor 9. The relay-type wiper control apparatus comprises a combination switch (inclusive of a variable resistor 10A), a two-speed type wiper motor 7A, an AS switch 8A, a washer motor 9A and a relay 60.

The combination switch 2B includes an AS terminal connected to an AS switch 8A through a relay 60, an LO terminal connected to a low speed terminal of a wiper motor 7A, an AMP-IN terminal connected to the INT terminal of a controller 3B, an HI terminal connected to the high speed terminal of a wiper motor 7A and a GND terminal to ground and WASH terminal connected to the washer motor 9A.

The controller 3B, in addition to the controller 3 shown in FIG. 1, includes an IG 2 terminal connected to a fuse 13A for supplying a power supply voltage to the wiper motor 7A, a RLY terminal connected to a coil of a relay 60, an WS2 terminal connected to the WASH terminal of the combination switch 2B, an INT2 terminal connected to the AMP-IN terminal of the combination switch 2B, an VR2 terminal connected to the VR terminal of the combination switch 2B and a GND terminal. The controller 3B serves to control both MOSFETs 4, 5 and relay 60.

For example, the wiper motor 7A of the relay-type wiper control apparatus having a conventional arrangement serves to drive a front wiper and the wiper motor 7 of the wiper control apparatus according to the present invention severs to drive a rear wiper.

In this way, the controller 3B includes the collected function of controlling both MOSFETs 4, 5 and relay 60, and hence can be down-sized and made inexpensive. The control is correlated between the front wiper and rear wiper.

Further, in a further embodiment, the present invention can be applied to a wiper control apparatus in which the wiper is driven at variable speeds using a single speed wiper motor.

Figure 16:
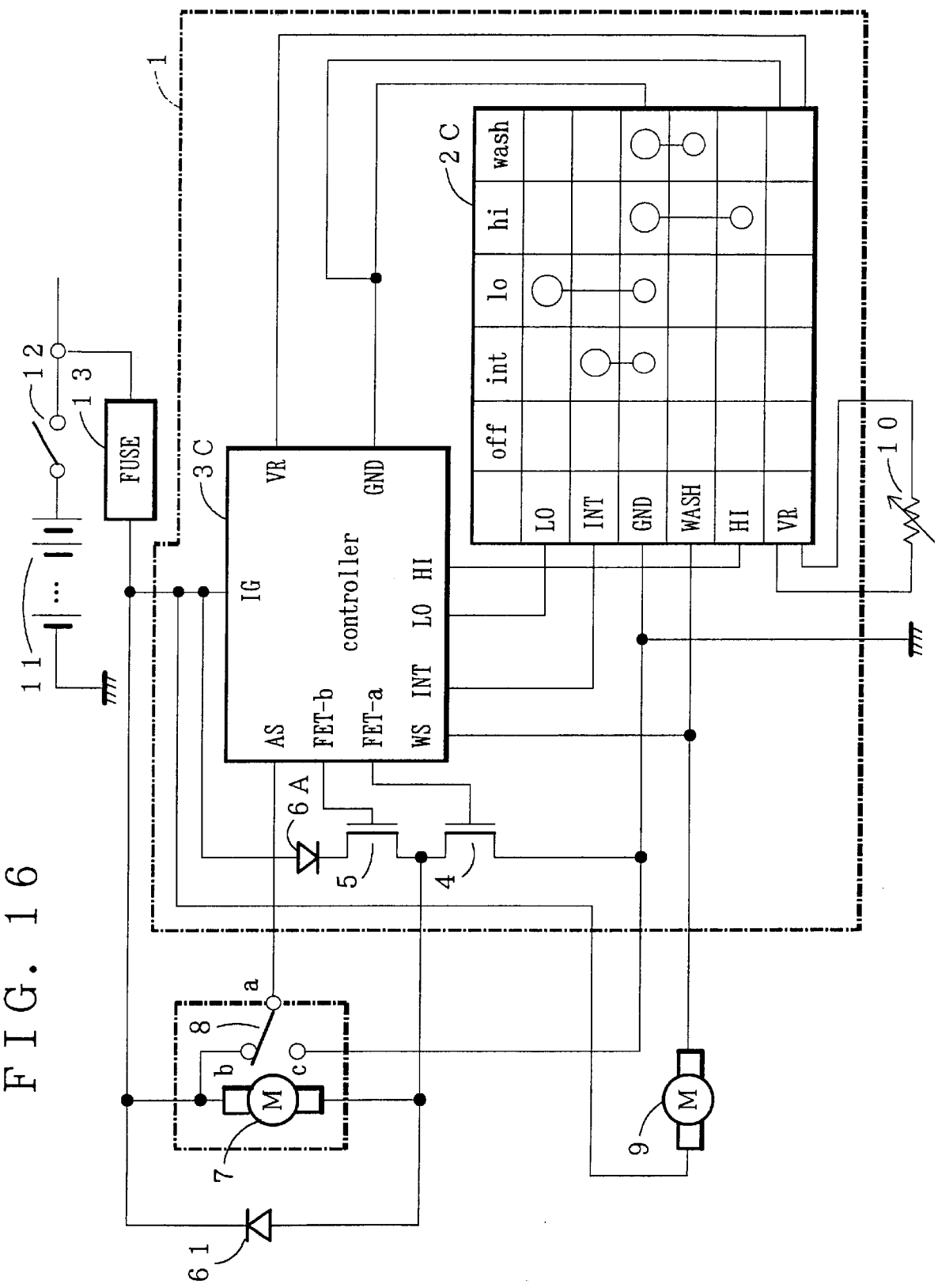
FIG. 16 is a block diagram showing a further embodiment of a wiper control apparatus according to the present invention, i.e. a wiper control apparatus which is driven at variable speeds by a single-speed wiper motor.

In this case, as shown in FIG. 16, the wiper is driven at two steps of speeds using the single speed wiper motor 7. The wiper control apparatus shown in FIG. 16 is different from that shown in FIG. 1 in only that a combination switch 2C has an LO terminal and an HI terminal in place of the ON terminal of the combination switch 2 shown in FIG. 1, a controller 3C has an LO input and an HI input in place of the ON input of the controller 3 of FIG. 1, and a diode 61 is connected across the wiper motor 7.

Figure 17:
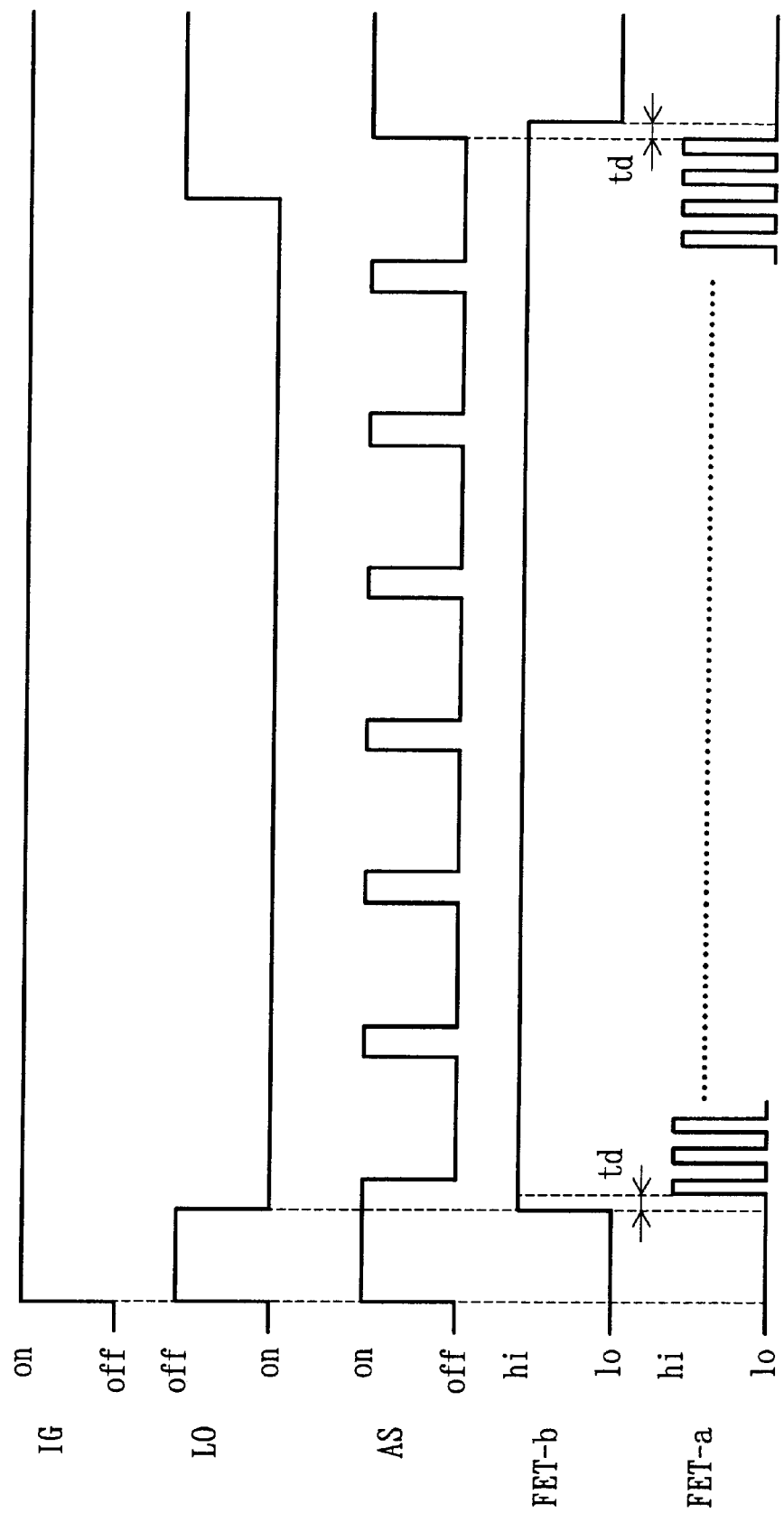
FIG. 17 is a timing chart of signals at several points in the wiper control apparatus of FIG. 16.

In the configuration shown in FIG. 16, during the low speed continuous driving (LO), as seen from FIG. 17, the controller 3C chopper-controls the control signal from the control output FET-a to reduce the rotary speed of the wiper motor 3C. During the high speed driving, the controller 3C varies the duty ratio of the control signal from the control output FET-a to make the speed of the wiper motor variable in plural steps of three or more or continuously. Further, the chopper frequency is adjusted to avoid the resonance frequency different for a vehicle type, thereby suppressing the noise by the chopper control. Further, where the wiper remains on the windshield glass when the IG switch 12 is energized, by returning the wiper to the park position in the high speed mode, the field of viewer can be assured swiftly.

In this way, by chopper-controlling the control output FET-a of the controller 3, the wiper is driven at variable speeds. This permits the configuration of the wiper control apparatus to be simplified.

Figure 18:
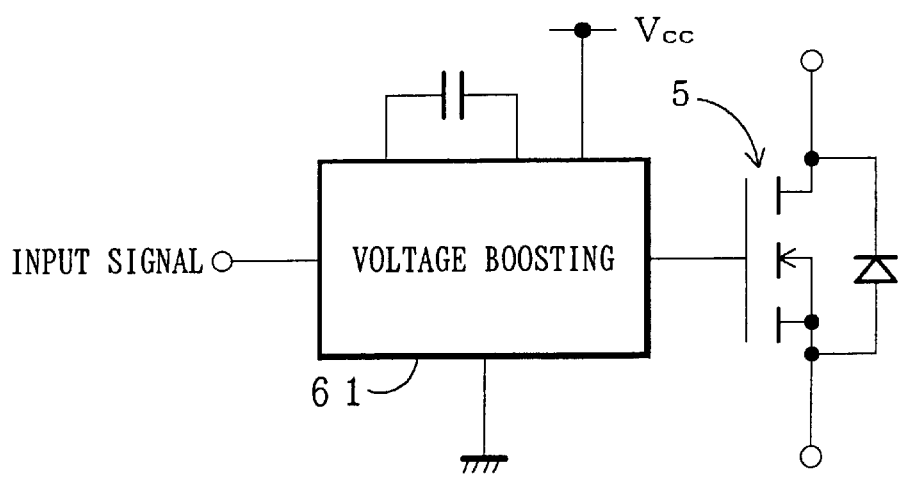
FIG. 18 is a circuit diagram showing a further wiper control apparatus according to the present invention.

In a further embodiment of the wiper control apparatus according to the present invention, the MOSFET 5 for braking the wiper motor may be an N-channel type instead of the P-channel type. In this case, as shown in FIG. 18, the gate of the N-channel type MOSFET 5 must be connected to a voltage multiplying means such as a boot strap circuit, a charge pump circuit, etc. Since the N-channel MOSFET has small ON resistance of about half the P-channel type MOSFET, with the same rating of the ON resistance, it can be down-sized or made inexpensive more largely than the P-channel type.

Figure 19:
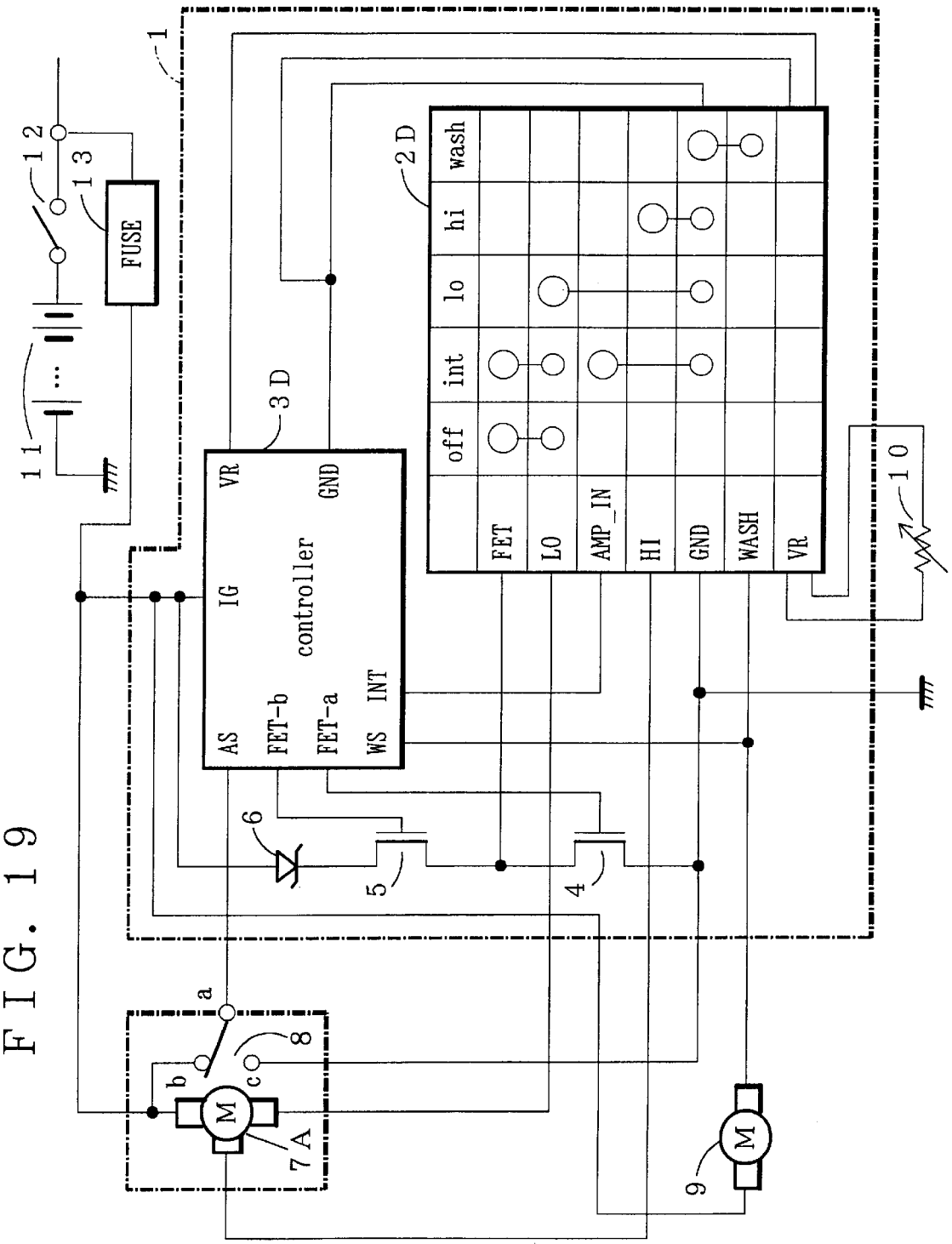
FIG. 19 is a block diagram a still further embodiment according to the present invention, i.e. a control device for driving the wiper motor at two speeds.

In a further embodiment, as shown in FIG. 19, the present invention can be applied to a wiper control apparatus in which a two-speed wiper motor is driven. The two-speed wiper motor is commonly employed for a wiper for the front glass of a vehicle.

As seen from FIG. 19, the wiper control apparatus according to this embodiment comprises a combination switch 2D, a controller 3D, MOSFETs 4, 5, a Zener diode 6, a two-speed wiper motor 7A, a washer motor 9 and a variable resistor 10.

The combination switch 2D includes an FET terminal connected to the drain of the MOSFET 4 and source of the MOSFET 5, an LO terminal connected to the low speed terminal of the wiper motor 7A, an AMP-IN terminal connected to the INT2 terminal of the controller 3B, an HI terminal connected to the high speed terminal of the wiper motor 7A, a GND terminal connected to ground and a WASH terminal connected to the washer motor.

The controller 3D has an arrangement in which the ON input is omitted from the arrangement of the controller of FIG. 1. In the configuration shown in FIG. 19, during the intermittent operation, the wiper motor 7A is driven by the MOSFET 4 at the same timings as shown in FIG. 5. The low speed continuous rotation and high speed continuous rotation are directly on/off controlled by the LO terminal and HI terminal of the combination switch 2D. During the low speed continuous rotation (LO) and the high speed continuous rotation (HI), the MOSFET 4 is separated from the wiper motor 7A by the FET terminal of the combination switch 2D. When the IG switch 12 is turned on with the wiper remaining on the windshield glass, even with the combination switch 2D being at the OFF position, the wiper motor 7A is driven by the MOSFET 4 until the wiper reaches the park position.

In this way, the low speed continuous driving (LO) and the high speed continuous driving (HI) are directly on/off controlled by the LO terminal and HI terminal of the combination switch 2D, the current rating of the MOSFETs 4 and 5 can be made small. Thus, these MOSFETs can be downsized and made inexpensive. Further, during the LO driving and HI driving, since the MOSFETs 4 and 5 are separated from the wiper motor 7, these MOSFETs are not influenced by the electromotive force of the wiper motor coil. This makes it unnecessary to add a protection element.

Figure 20:
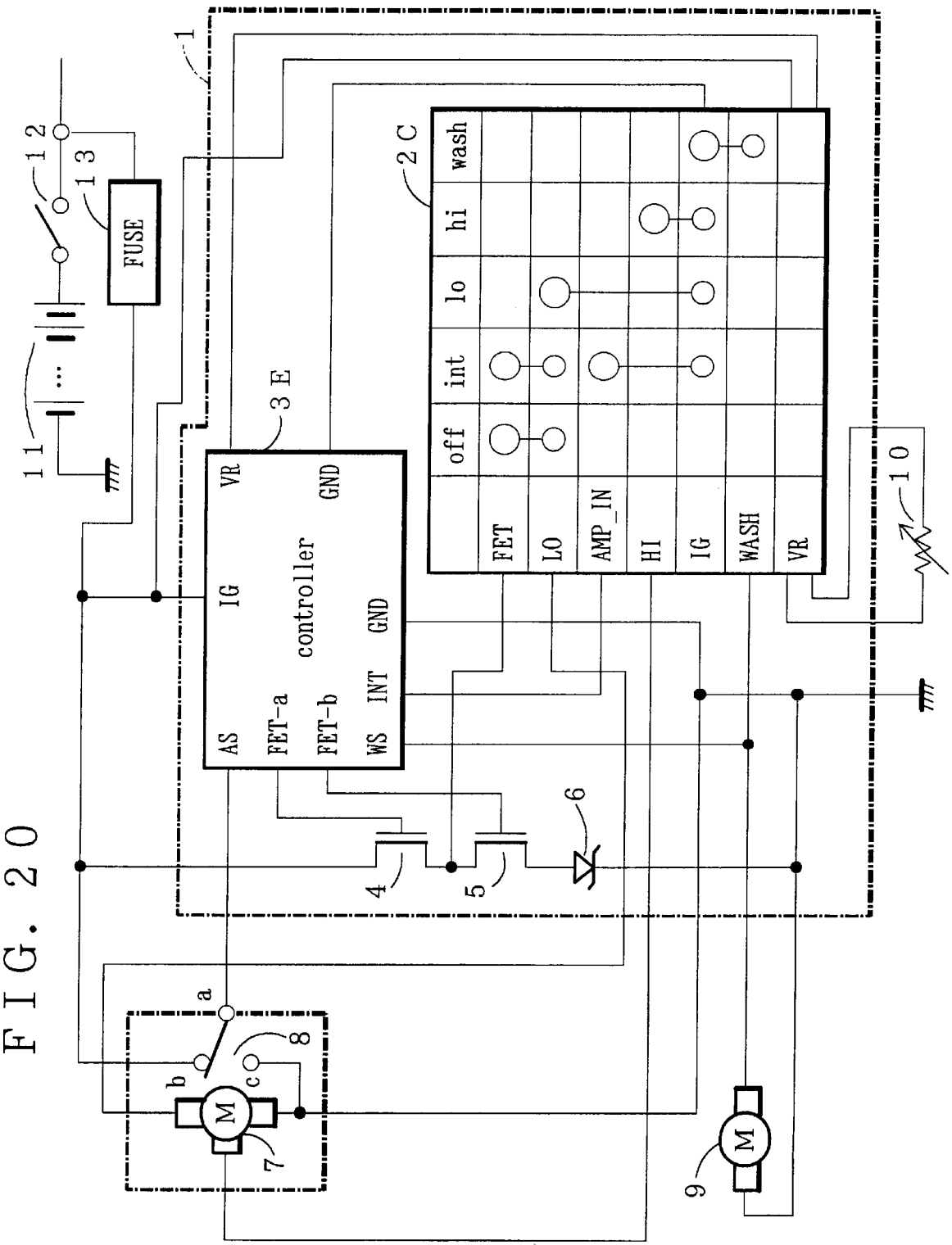
FIG. 20 is a block diagram showing a further embodiment according to the present invention, i.e. a high-side switch type wiper control apparatus for driving a wiper motor at two speeds.
Figure 21:
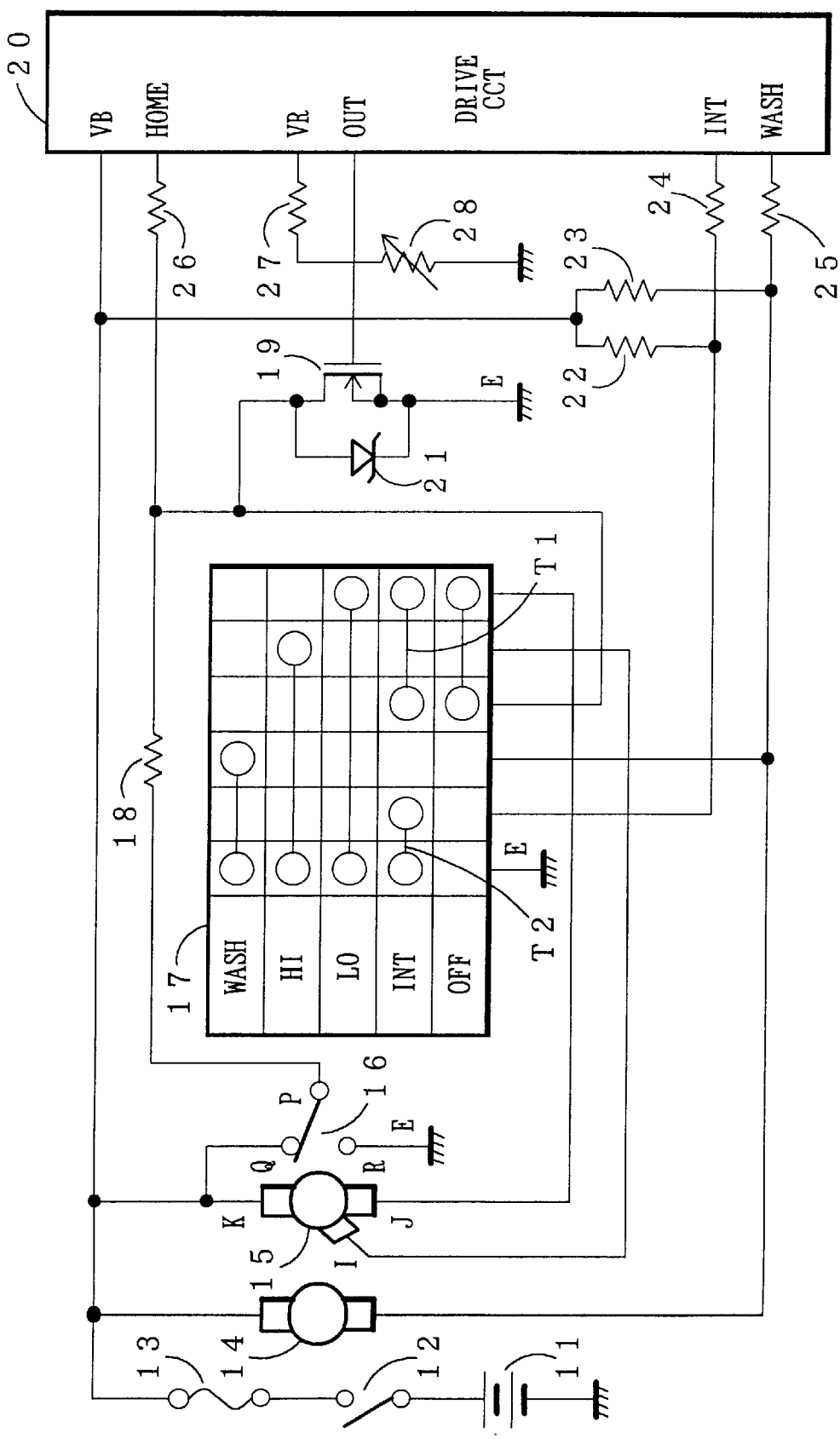
FIG. 21 is a circuit diagram showing the configuration of a conventional wiper.

In the wiper control apparatus shown in FIG. 19, although the MOSFET 4 serving as a semiconductor switch element for driving the wiper motor is arranged on the downstream side (low side) of the wiper motor 7, in a further embodiment, as shown in FIG. 20, the MOSFET 4 may be arranged on the upstream side (high side) of the wiper motor 7.

In this case, the MOSFET 4 is a P-channel type MOSFET whereas the MOSFET 5 is a N-channel type MOSFET. Both MOSFETs 4 and 5 have the ON/OFF relationship for "high" and "low" of a signal which is reverse to the case of FIG. 1. A Zener diode 6 is connected between the source of the MOSFET 5 and ground. The combination switch 2E has an IG terminal connected to the fuse 13 in place of the GND terminal of the combination switch 2D of FIG. 19. The controller 3E is provided with a GND port added to the configuration of the controller 3D shown in FIG. 19.

The high-side switch type of wiper control apparatus shown in FIG. 20 has the same advantage as that for the low-side switch type of wiper control apparatus shown in FIG. 19.

What is claimed is:

1. A wiper control apparatus comprising:
 a combination switch for setting an operation mode of a wiper at an intermittent wiper operation mode or a continuous wiper operation mode by means of position setting;
 a wiper motor which is driven according to the operation mode set by said combination switch;
 an autostop (AS) switch for producing a signal having a level varying according to a park position and other positions as the wiper motor rotates;
 a first semiconductor switch element for on/off controlling energization of the wiper motor;
 a controller for supplying an ON/OFF control signal on/off controlling the first semiconductor switch element, wherein while the wiper operates in the operation mode set by said combination switch, if the level of the signal produced from said AS switch does not vary for a longer period than a prescribed abnormality detecting period owing to occurrence of abnormality of said wiper motor, said controller forcibly turns off said first semiconductor switch element.

2. A wiper control apparatus according to claim 1, wherein after said abnormality is released, said controller decides that a set position of said combination switch has been changed selected and turns on said first semiconductor switch element to operate the wiper in the operation mode corresponding to changed set position.

3. A wiper control apparatus according to claim 1, wherein said controller is supplied with a driving voltage through an ignition switch from a battery, and after the abnormality is released, said controller detects re-energization successive to "off" of said ignition switch to turn on said semiconductor switch element and restore the operation of the wiper which had been set when the abnormality has occurred.

4. A wiper control apparatus according to claim 1, wherein said first semiconductor switch element is connected to an upstream side or downstream side of said wiper motor.

5. A wiper control apparatus according to claim 1, wherein said controller chopper-controls the ON/OFF control signal for said first semiconductor switch element so that said wiper motor is driven at variable speeds.

6. A wiper control apparatus according to claim 5, wherein if the wiper has not yet been returned when said ignition switch is energized, said controller drives said wiper motor at a high speed so that the wiper is returned to t he park position.

7. A wiper control system comprising a wiper control apparatus according to claim 1 and a relay-type wiper control apparatus, wherein said controller controls the operation of both wiper control apparatus and relay-type control apparatus.

8. A wiper control apparatus comprising:
   a combination switch for setting an operation mode of a wiper at an intermittent wiper operation mode or a continuous wiper operation mode by means of position selection;
   a wiper motor which is driven according to the operation mode set by said combination switch;
   an autostop (AS) switch for producing a signal whose level varies according to a park position and other positions as the wiper motor rotates;
   a first semiconductor switch element for on/off controlling energization of the wiper motor;
   a second semiconductor switch element for turning on a closed circuit for braking said wiper motor by passing a reverse current through said wiper motor while energization for said wiper motor is off;
   a controller for supplying a first ON/OFF control signal to the first semiconductor switch element and a second ON/OFF control signal to said second semiconductor switch element, wherein said controller provides a time delay td between rising edges or between trailing edges of said first ON/OFF control signal and said second ON/OFF control signal.

9. A wiper control apparatus according to claim 8, wherein said first semiconductor switch element is an N-channel type MOSFET and said second semiconductor switch element is a P-type MOSFET.

10. A wiper control apparatus according to claim 9, wherein a Zener diode is connected in series with said second semiconductor switch element.

11. A wiper control apparatus comprising:
    a combination switch for setting an operation mode of a wiper at an intermittent wiper operation mode, a continuous wiper operation mode or a washer operation mode by means of position selection;
    a wiper motor which is driven according to the operation mode set by said combination switch;
    an autostop (AS) switch for producing a signal whose level varies according to a park position and other positions as the wiper motor rotates;
    a first semiconductor switch element for on/off controlling energization of the wiper motor;
    a washer motor which is energized and driven by the combination switch while the wiper operates in the washer mode;
    a controller for supplying an ON/OFF control signal to the first semiconductor switch element, wherein said controller controls the first semiconductor switch element to be "ON" while the combination switch is at the washer operation mode, and keeps the "ON" of said first semiconductor switch element until said wiper reciprocates by a prescribed number of times to perform an after-wash wiping operation after the combination switch has been changed into the OFF position.

12. A wiper control apparatus according to claim 11, wherein said prescribed number of times can be variable set by said controller.

13. A wiper control apparatus according to claim 11, wherein when the combination switch is changed from the washer operation mode into the OFF position through another mode, if the number of times of the after-wash wiping does not still reach a prescribed value, said controller keeps the "ON" of said first semiconductor element until said wiper performs the after-wash wiping by the remaining number of times.

14. A wiper control apparatus according to claim 1, wherein said combination switch includes a variable resistor for adjusting an intermittent time while it is in the intermittent wipe operation mode, and said controller includes an VR input terminal for inputting a resistance value of said variable resistor from said combination switch so that the resistance value of said variable resistor is A/D converted to set the intermittent time in a digital manner.

15. A wiper control apparatus according to claim 14, wherein said controller sets the intermittent time at a prescribed value when said VR input terminal is released.

16. A wiper control apparatus comprising:
    a combination switch for setting an operation mode of a wiper at an intermittent wiper operation mode or a continuous wiper operation mode by means of position selection;
    a wiper motor which is driven according to the operation mode set by said combination switch;
    an autostop (AS) switch for producing a signal whose level varies according to a park position and other positions as the wiper motor rotates;
    a first semiconductor switch element for on/off controlling energization of the wiper motor; and
    a controller for supplying and ON/OFF control signal to the first semiconductor switch element, wherein said first semiconductor switch element is provided with an overheating interruption/protection circuit so that it is self-interrupted into OFF by said over-heating interruption/protection circuit when it is overheated owing to occurrence of abnormality of the wiper motor, said overheating interruption/protection circuit includes a D-type FF serving as a latch circuit and a second semiconductor switch element having the same configuration as the first semiconductor switch element and connected between the latch circuit and the first semiconductor switch element.

17. A wiper control apparatus according to claim 16, wherein after said abnormality is released, said controller decides that a set position of said combination switch has been changed and turns on said first semiconductor switch element to operate the wiper in the operation mode corresponding to said changed set position.

18. A wiper control apparatus according to claim 17, wherein said controller is supplied with a driving voltage through an ignition switch from a battery, and after the abnormality is released, said controller detects re-energization successive to "off" of said ignition switch to turn on said semiconductor switch element and restore the operation of the wiper which had been set when the abnormality has occurred.

* * * * *